US012589856B2

(12) United States Patent 
Daouk

(10) Patent No.: US 12,589,856 B2 
(45) Date of Patent: Mar. 31, 2026

(54) LIQUID RETENTION DEVICE FOR EQUIPMENT CARRIED BY A VEHICLE

(71) Applicant: Antar Daouk, Paris (FR)

(72) Inventor: Antar Daouk, Paris (FR)

( * ) Notice: Subject to any disclaimer, the term of this patent is extended or adjusted under 35 U.S.C. 154(b) by 392 days.

(21) Appl. No.: 18/036,688

(22) PCT Filed: Nov. 15, 2021

(86) PCT No.: PCT/FR2021/052013 
§ 371 (c)(1), 
(2) Date: May 12, 2023

(87) PCT Pub. No.: WO2022/101592 
PCT Pub. Date: May 19, 2022

(65) Prior Publication Data 
US 2023/0406478 A1 Dec. 21, 2023

(30) Foreign Application Priority Data

Nov. 16, 2020 (FR) ........................................ 2011730 
Aug. 9, 2021 (FR) ........................................ 2108595

(51) Int. Cl. 
*B64C 1/00* (2006.01) 
*B64C 1/18* (2006.01) 
(52) U.S. Cl. 
CPC ..................................... *B64C 1/18* (2013.01) 
(58) Field of Classification Search 
CPC ........ B64D 9/00; A61G 1/06; A61G 2220/10; B60N 3/044; A47L 23/24; Y10T 428/24149; B64C 1/18 
USPC ..................................................... 296/97.23 
See application file for complete search history.

(56) References Cited

U.S. PATENT DOCUMENTS

| | | | |
|---|---|---|---|
| 3,605,166 A | 9/1971 | Chen | |
| 4,211,447 A | 7/1980 | Divincenzo | |
| 4,609,580 A * | 9/1986 | Rockett ..................... | B32B 7/05 |
| | | | 428/340 |
| 5,827,022 A | 10/1998 | Tovani | |

(Continued)

FOREIGN PATENT DOCUMENTS

| | | |
|---|---|---|
| CN | 108297945 A | 7/2018 |
| EP | 3081430 A1 | 10/2016 |
| WO | 2017100837 A1 | 6/2017 |

OTHER PUBLICATIONS

United States Certificate of Correction dated Apr. 20, 1999 corresponding to patent No. 5827022.

*Primary Examiner* — Steven O Douglas 
(74) *Attorney, Agent, or Firm* — Nath, Goldberg & Meyer; Joshua B. Goldberg

(57) ABSTRACT

The invention relates to a liquid retention device (1) intended to be carried on the interior floor of a vehicle and designed and configured to receive a piece of equipment carried by said vehicle, comprising: an attachment means (26) for attaching the liquid retention device (1) to the carried equipment, and/or securing means for attaching the retention device to the interior floor, an upper wall (3) designed and configured to support the equipment, the upper wall being provided with a plurality of through-holes (4), a liquid storage tank (5) at least partially arranged below the upper wall, the storage tank being designed and configured to receive the liquid passing through the through-holes. Equipment for a vehicle interior floor.

27 Claims, 15 Drawing Sheets

(56)          References Cited

U.S. PATENT DOCUMENTS

| 8,460,775  B2 * | 6/2013 | Engelhardt | ............. | A47L 23/22 |
| | | | | 428/68 |
| 8,852,717  B2 * | 10/2014 | Davis | ........................ | B32B 7/05 |
| | | | | 119/169 |
| 2010/0272944  A1 | 10/2010 | Engelhardt | | |

* cited by examiner

[FIG 8]
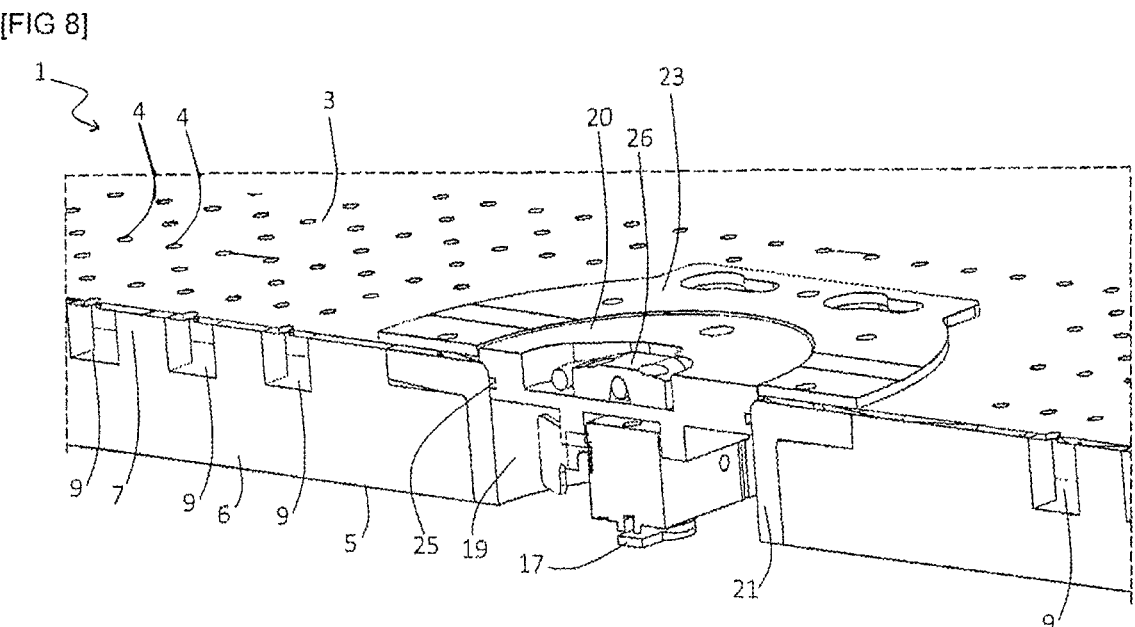
[FIG 9]
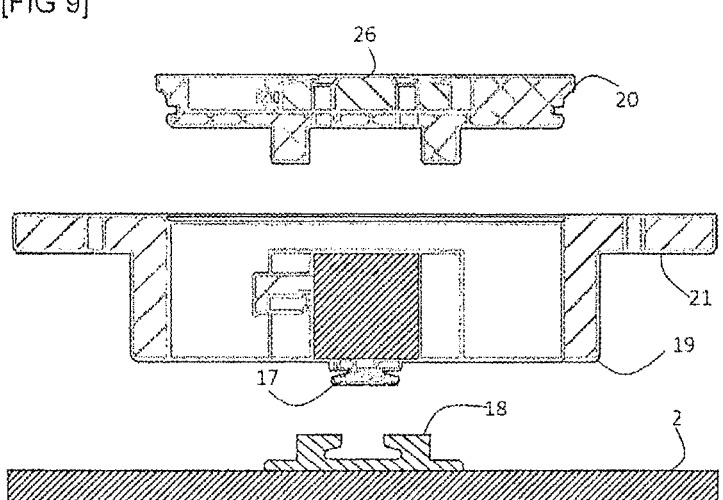

[FIG 10]
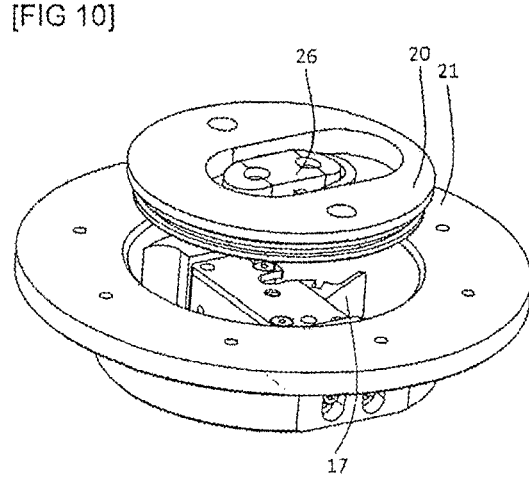
[FIG 11]
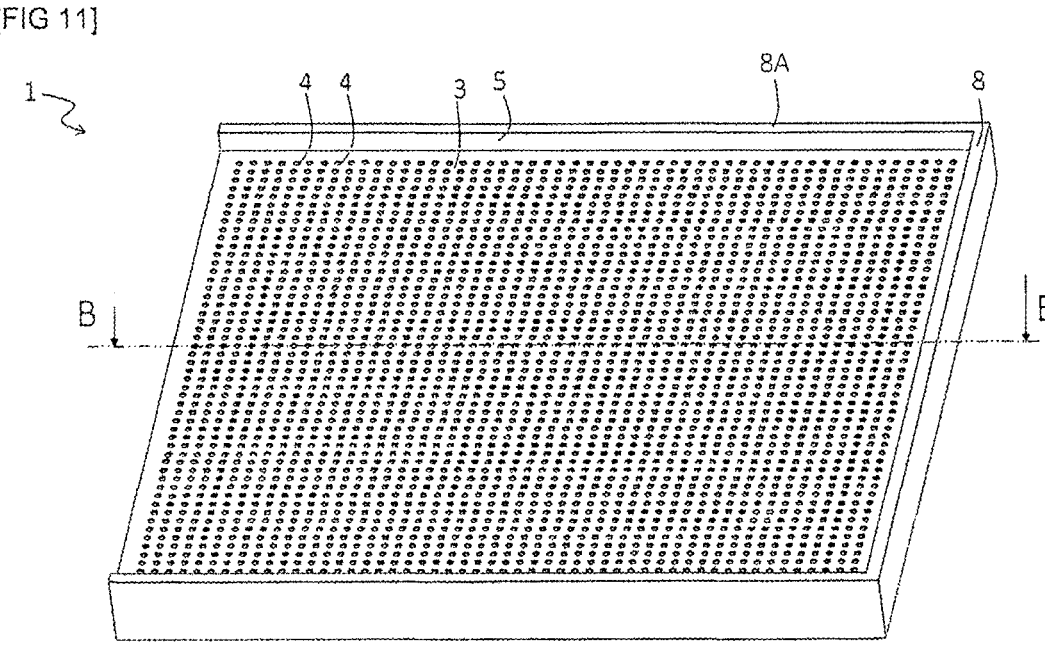

[FIG 12]
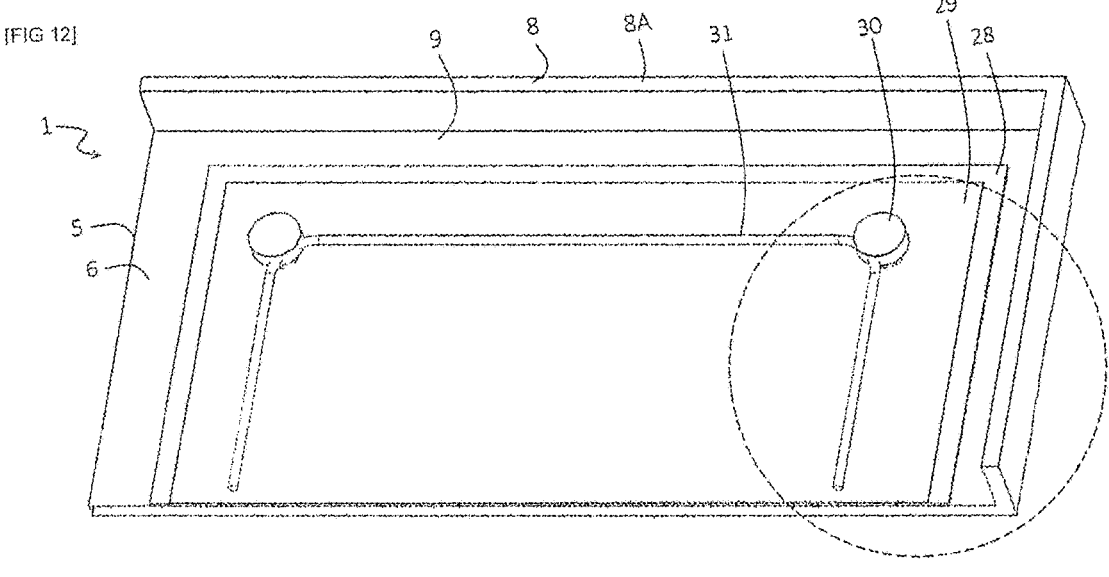
[FIG 13]
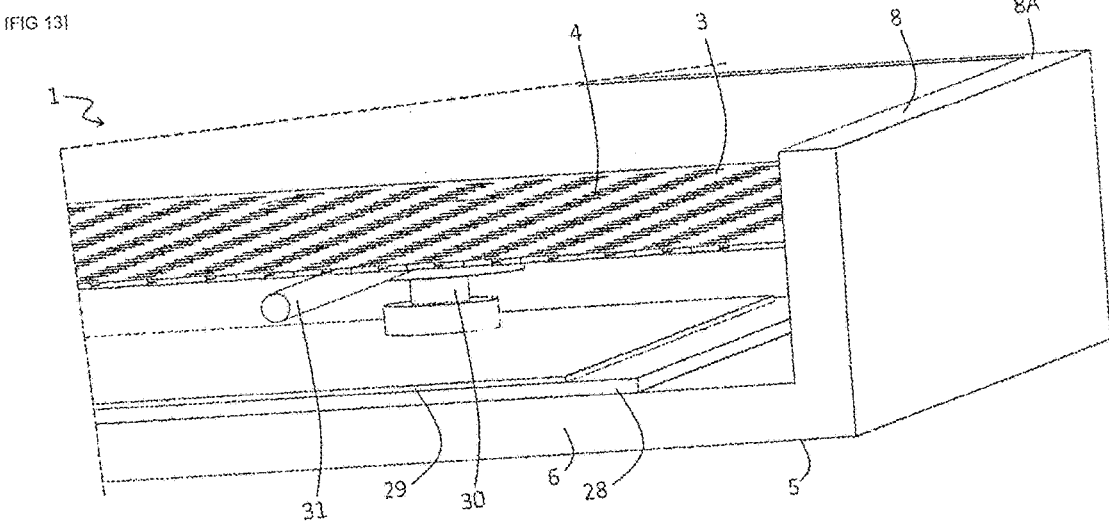

LIQUID RETENTION DEVICE FOR EQUIPMENT CARRIED BY A VEHICLE

This is a National Phase Application filed under 35 U.S.C. 371 as a national stage of PCT/FR2021/052013, filed Nov. 15, 2021, an application claiming the benefit of French Application No. 2011730, filed Nov. 16, 2020, and French Application No. 2108595, filed Aug. 9, 2021, the content of each of which is hereby incorporated by reference in its entirety.

TECHNICAL FIELD

The present invention relates to the general technical field of equipment for vehicle interior floor, and more particularly that of devices for supporting on-board material and for retaining a liquid flowing out of the latter.

The present invention more precisely relates to a liquid retention device intended to be carried on the interior floor of a vehicle and designed and configured to receive a piece of equipment taken on board said vehicle, for example a seat or a stretcher, in particular during an evacuation mission.

The present invention also relates to a vehicle comprising an interior floor.

PRIOR ART

During a mission to evacuate an individual from the open sea, it is often necessary to use a helicopter fitted with a hoistable stretcher. The latter is intended to be lowered from the helicopter into the liquid to pick up the individual to be rescued, with the help of rescue workers or specialised operators. The stretcher carrying the individual is then hoisted up and positioned on the interior floor of the helicopter.

So, it is known to install a water retention tray on the interior floor of the helicopter. This known retention tray is intended to support, at the end of the rescue operation, the stretcher soaked with sea water. The known retention tray moreover forms a receptacle collecting the sea water flowing from the stretcher in order to prevent it from spilling uncontrollably within the helicopter and damaging material, for example medical material, placed inside the helicopter, or components, for example electronic components, of the helicopter. This known retention tray comprises a bottom and edges covered with a waterproof membrane, the stretcher being received on the bottom.

Now, the implementation of this known tray, although it generally allows the tasks assigned to be carried out, is not fully satisfying.

Indeed, during the return travel, once the intervention at sea completed, the stretcher soaks, during the whole travel, in the sea water contained in the retention tray, which is source of discomfort for the victim and the members of the rescue team, these latter wading in the sea water contained in the retention tray. In addition, in such a situation, there is a risk that the rescuers spread water in the helicopter, causing that way material damage. Moreover, the more or less abrupt attitude changes of the helicopter and the rotation of its blades shake the water collected in the retention tray, which causes a risk of splashing not only to people but also to equipment, including fragile equipment (for example, electric or electronic equipment).

Moreover, the known retention trays suffer from a relative fragility, and a durability that is not optimum, due to the risk of tearing of the waterproof membrane, in particular at the time when the stretcher is docked to the tray, which is generally carried out rather forcibly, given the emergency circumstances in which a rescue at sea is most often carried out.

Finally, the draining of the known retention trays is generally a tedious and difficult operation, which entails a risk of accidentally spilling some of the water into the helicopter.

DISCLOSURE OF THE INVENTION

The objects assigned to the present invention therefore aim to remedy the different above-mentioned drawbacks, and to propose a new liquid retention device intended to be carried on the interior floor of a vehicle and that, while being particularly robust, reliable and durable, makes it possible to significantly reduce, if not eliminate, any trouble caused by the liquid retained by the retention device.

Another object of the invention aims to propose a new liquid retention device intended to be carried on the interior floor of a vehicle, which is convenient to use and quick and easy to install.

Another object of the invention aims to propose a new liquid retention device intended to be carried on the interior floor of a vehicle, which is able to receive a stretcher (or any other on-board equipment) in optimum security and comfort conditions, both for the individual on the stretcher and for the potential operators or rescuers around the latter.

Another object of the invention aims to propose a new liquid retention device intended to be carried on the interior floor of a vehicle, whose maintenance may be carried out easily and in optimum comfort and security conditions.

Another object of the invention aims to propose a new liquid retention device intended to be carried on the interior floor of a vehicle, whose draining may be carried out easily and rapidly, at any convenient time.

Another object of the invention aims to propose a new liquid retention device intended to be carried on the interior floor of a vehicle, whose design allows it to support in a secure way one or several external pieces of equipment, such as a stretcher.

Another object of the invention aims to propose a new liquid retention device intended to be carried on the interior floor of a vehicle, which is of particularly resistant and durable construction.

Another object of the invention aims to propose a new liquid retention device intended to be carried on the interior floor of a vehicle, which is reliable over time, and which requires only minimum maintenance.

Another object of the invention aims to propose a new liquid retention device intended to be carried on the interior floor of a vehicle, whose design makes it possible to limit any unintentional spillage of liquid from the retention device, including when the vehicle is subjected to abrupt attitude changes.

Another object of the invention aims to propose a new liquid retention device intended to be carried on the interior floor of a vehicle, whose manufacturing can be easily industrialised at controlled cost.

Another object of the invention aims to propose a new liquid retention device intended to be carried on the interior floor of a vehicle, which is particularly light weight and compact.

Another object of the invention aims to propose a new liquid retention device intended to be carried on the interior floor of a vehicle, whose structure is simple and comprises only a limited number of distinct parts.

Another object of the invention aims to propose a new vehicle particularly adapted to receive on its interior floor a piece of equipment, such as a stretcher, in optimum security and comfort conditions.

The objects assigned to the present invention are achieved by means of a liquid retention device intended to be carried on the interior floor of a vehicle and designed and configured to receive a piece of equipment taken on board said vehicle, for example a seat or a stretcher, in particular during an evacuation mission, the retention device comprising at least:

an attachment means configured to attach, preferably in a reversible way, said liquid retention device to said on-board equipment, and/or a fastening means configured to attach, preferably in a reversible way, the retention device to the interior floor of the vehicle, and in particular to a lashing rail fitted to said interior floor, an upper wall designed and configured to support said equipment, said upper wall being provided with a plurality of through-holes, and a liquid storage tank at least partly arranged below said upper wall, said storage tank being designed and configured to collect the liquid passing through said through-holes.

The objects assigned to the present invention are also achieved by means of a vehicle comprising an interior floor, characterized in that it further comprises at least one liquid retention device fitted to said interior floor, said liquid retention device being designed and configured to receive a piece of equipment taken on board said vehicle, for example a seat or a stretcher, in particular during an evacuation mission, and comprising at least:

an attachment means configured to attach, preferably in a reversible way, said liquid retention device to said equipment taken on board, and/or a fastening means configured to attach, preferably in a reversible way, the retention device to the interior floor of the vehicle, and in particular to a lashing rail fitted to said interior floor, an upper wall designed and configured to support said equipment, said upper wall being provided with a plurality of through-holes, and a liquid storage tank at least partly arranged below said upper wall, said storage tank being designed and configured to collect the liquid passing through said through-holes.

BRIEF DESCRIPTION OF THE DRAWINGS

Other features and advantages of the invention will appear in more detail upon reading of the following description, with reference to the appended drawings, given by way of purely illustrative and non-limiting examples, in which:

FIG. 8 illustrates, in a perspective view, a detail enlargement of elements of the retention device of FIG. 7, circled by dashes in this figure;

FIG. 9 schematically illustrates a cross-sectional view along a plane A-A of a set of elements of the retention device of FIG. 1, herein a tight well and elements within the latter, as well as a lashing rail and an interior floor of a vehicle;

FIG. 10 schematically illustrates, in a perspective view, an element of the retention device of FIG. 1, herein a tight well and elements within the latter;

FIG. 11 schematically illustrates, in a top perspective view, a liquid retention device according to the invention in another particular embodiment;

FIG. 12 schematically illustrates, in a perspective view, the liquid retention device of FIG. 11, with the difference that it is represented without the upper wall and that a portion, cut by a plane B-B, does not appear;

FIG. 13 schematically illustrates, in a perspective view, a detail enlargement of elements of the retention device of FIG. 12, circled by dashes in this figure;

BEST WAY TO IMPLEMENT THE INVENTION

Figure 1:
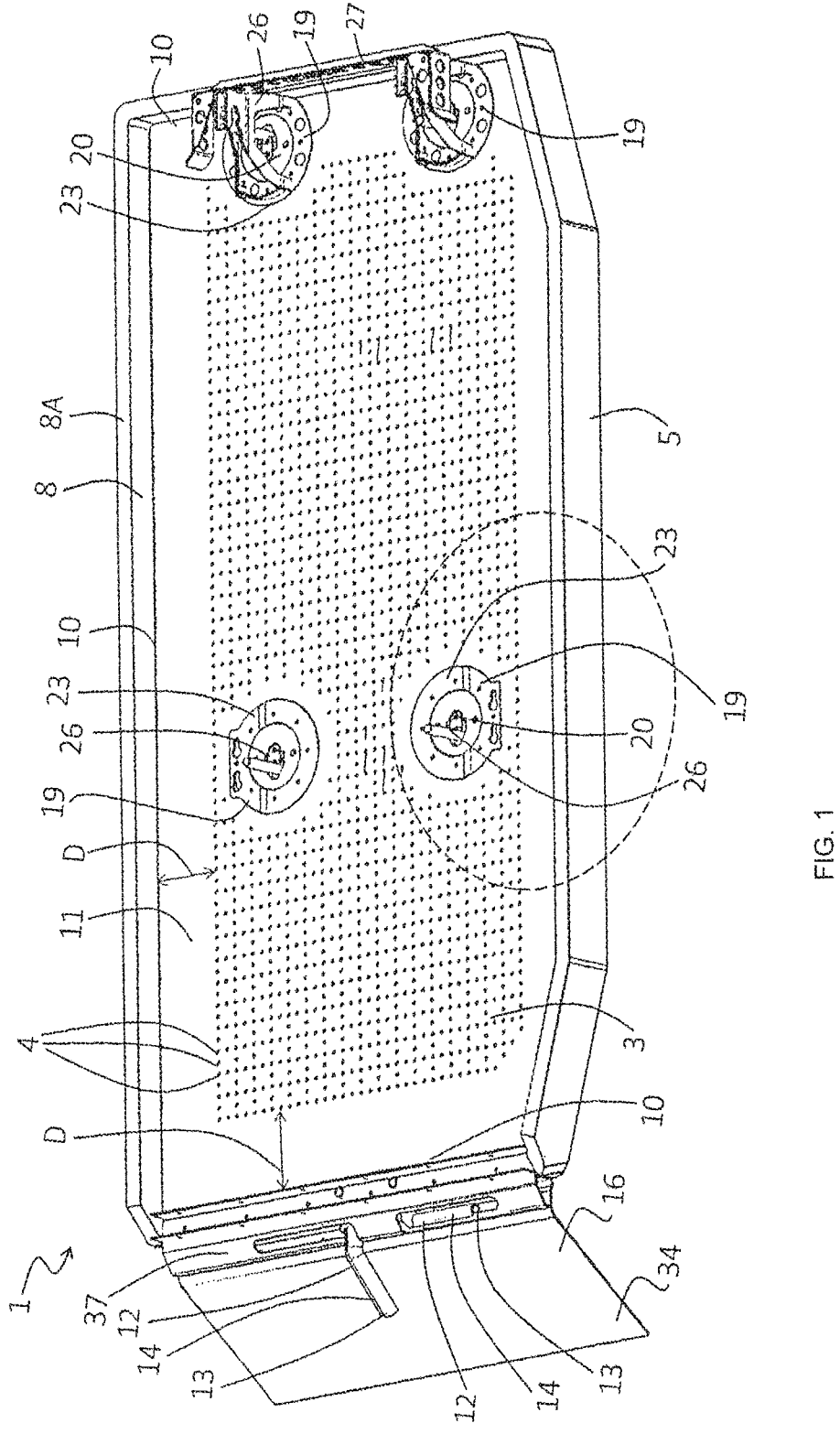
FIG. 1 schematically illustrates, in a top perspective view, a liquid retention device according to the invention in a particular embodiment.

The invention relates, according to a first aspect illustrated in the figures, a liquid retention device 1 intended to be carried on the interior floor 2 of a vehicle. The liquid retention device 1 is thus distinct from said interior floor 2, on which it is intended to be arranged. A particular embodiment of the liquid retention device 1 is illustrated in FIGS. 1 to 13, and another particular embodiment is illustrated in FIGS. 14 to 18. Unless otherwise stated in the following, the technical features described hereinafter in connection with the first of said embodiments are transposable mutatis mutandis to the other of said embodiments, and vice versa, even if some of said features are not necessarily illustrated in the figures relating to either one of said embodiments. For the sake of simplicity, common references to the drawings are used hereinafter to indicate identical or similar elements in each of these particular embodiments.

Said vehicle is preferably an aircraft, more particularly a rotary-wing aerodyne, and even more particularly a helicopter, for example a rescue or evacuation helicopter. As an alternative, the vehicle is a plane, or a terrestrial vehicle, such as an ambulance, a lorry, a utility vehicle, a van, or also a ship.

According to the invention, the liquid retention device 1 is moreover designed and configured to receive a piece of equipment (not illustrated) taken on board said vehicle, for example a seat or a stretcher, in particular during an evacuation mission. More particularly, the evacuation mission comprises an operation to recover an individual from a body of water, in particular from the sea (including on a ship), or also from a lake, a river or a stream. The recovery of said individual may alternatively be carried out on dry land. The on-board equipment comprises for example a stretcher, but it may also comprise a passenger seat of the vehicle, or other equipment. The on-board equipment is in particular relatively bulky and heavy, and has for example a greater dimension, for example a length, greater than or equal to 100 cm, and preferably greater than or equal to 150 cm. The on-board equipment has a mass higher than or equal to 10 kg, preferably higher than or equal to 15 kg, more preferentially higher than or equal to 20 kg, or even higher than or equal to 60 kg, in particular when the on-board equipment is a stretcher carrying an individual to be evacuated. The dimensions of the retention device 1 are preferably adapted to support the whole on-board equipment, that is to say that the retention device 1 is configured to be interposed between the interior floor 2 of the vehicle and the on-board equipment. The retention device 1 has for example a greater dimension (such as its length) higher than or equal to one metre. Obviously, the liquid retention device 1 may be designed and configured to receive a plurality of on-board pieces of equipment as described herein (stretcher, passenger seat, equipment box, medical equipment . . . ).

According to a particular embodiment, the on-board equipment comprises a stretcher, which has for example been immersed during the recovery of an individual from the sea (or another body of water). The individual is thus placed on the stretcher, the latter is then transported (for example, helicoptered) in the vehicle, which is for example a helicopter, for the rescued individual to be evacuated. In this latter particular case or in other situations, the liquid comprises for example water, but it may also comprise another liquid matter. The on-board equipment can moreover comprise one or several passenger seats, on which rescuers, also wet after the recovery of the individual from the sea, may seat. The liquid retention device 1 is thus advantageously designed to capture and retain the liquid (in particular, water) that flows from the wet stretcher and/or from the passenger seat(s) and/or from any other equipment soaked during the recovery and evacuation of the individual placed on the stretcher. This liquid retention, in particular abundant and salty water, makes it possible to reduce the discomfort of the rescuers and of the evacuated individual while preventing potential degradations of sensitive components (in particular electric and electronic components) of the vehicle (and in particular a helicopter) or taken on board the latter. The on-board equipment may also be an equipment box, or any other type of on-board equipment.

For example, the liquid comprises or is formed of water (in particular, sea water), oil, a hydrocarbon, blood, a detergent, another fluid in liquid form, or a mixture of several of these substances. The liquid may possibly be polluted and/or contaminated, and as such must be stored in a controlled manner by the retention device 1.

According to the invention, the liquid retention device 1 comprises at least:

an upper wall 3 designed and configured to support said equipment, said upper wall 3 being provided with a plurality of through-holes 4, and a liquid storage tank 5 at least partly arranged below said upper wall 3, said storage tank 5 being designed and configured to collect the liquid passing through said through-holes 4.

Said upper wall 3 is thus advantageously intended to receive all the weight of said on-board equipment, in particular all the weight of a stretcher, the latter being preferably wet, for example with sea water. Said upper wall 3 has advantageously a generally flat surface. Said storage tank 5 is advantageously liquid tight, that is to say it preferably comprises walls designed to be impervious to liquid. Said storage tank 5 is advantageously designed so that its tightness can be controlled, that is to say a liquid draining means may exist, comprising for example a draining hole made in one of the walls of said storage tank 5, as will be seen hereinafter.

Advantageously, the upper wall 3 is formed by at least one plate provided with said through-holes 4, these latter going through the whole thickness of said plate. Said through-holes 4 are for example, as illustrated in the figures, circular in shape, and, in a particular embodiment, they form perforations. Said liquid storage tank 5 advantageously forms a tray, which preferably has its own mechanical strength, that is to say that the liquid storage tank 5 preferably has a certain stiffness (but also possibly a certain flexibility) and above all is not flaccid. Advantageously, the upper wall 3 is positioned at least in part, and preferably fully, within said storage tank 5 (and hence within said tray).

Said through-holes 4 are preferably relatively small and discrete, and have for example a diameter lower than 2 cm, preferably lower than 1.5 cm, and for example a diameter higher than 0.2 mm. The upper wall 3 has for example a width higher than or equal to 40 cm, preferably higher than or equal to 50 cm, and a length higher than or equal to 100 cm, preferably higher than or equal to 150 cm. The upper wall advantageously has a thickness lower than 3 cm, preferably lower than 2 cm, for example between 0.5 and 1.5 cm. The upper wall 3 being preferably placed within said storage tank 5, the latter advantageously has width an length substantially conjugated and/or similar (in a margin of error of 15%, for example) to that of the upper wall 3. Said through-holes 4 are preferably distributed substantially regularly over said upper wall 3, and preferably over at least 50% of said upper wall 3, more advantageously at least 70% of said upper wall 3, for example about 80% (+/−5%) of said upper wall 3.

Thus, as illustrated in the figures, the storage tank 5 advantageously comprises at least a bottom 6, from which rise, in the particular embodiment illustrated specifically in FIGS. 4, 5, 7 and 8, a plurality of projections 7 that are distinct and distant from each other, on which is supported said upper wall 3. Therefore, each projection 7 advantageously forms a protrusion rising from said bottom 6 and on which said upper wall 3 comes into contact. Said projections 7 have, in the embodiment illustrated in FIGS. 4, 5, 7 and 8, a substantially rectangular or square cross section (horizontal), but their cross section could also be round, circular, elliptic, triangular or of any other suitable shape. Thus, said projections 7 have for example a generally tiled or cubic, pyramidal or cylindrical shape. The projections 7 operate in particular to hinder or block the spillage of liquid out of said storage tank 5 during a movement of the vehicle, for example during an acceleration and/or a change of tilt angle of the latter.

Figure 2:
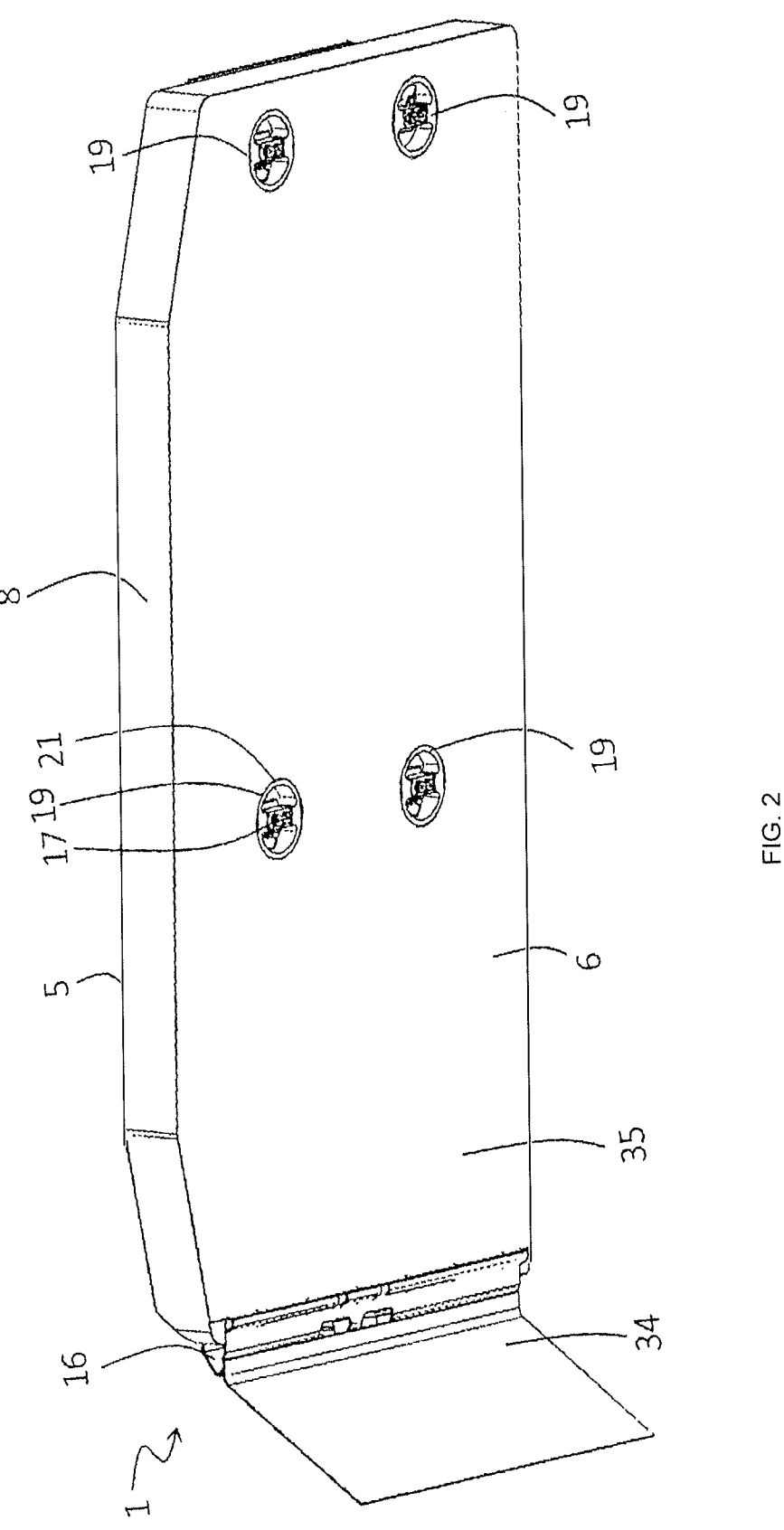
FIG. 2 schematically illustrates, in a bottom perspective view, the liquid retention device of FIG. 1.
Figure 3:
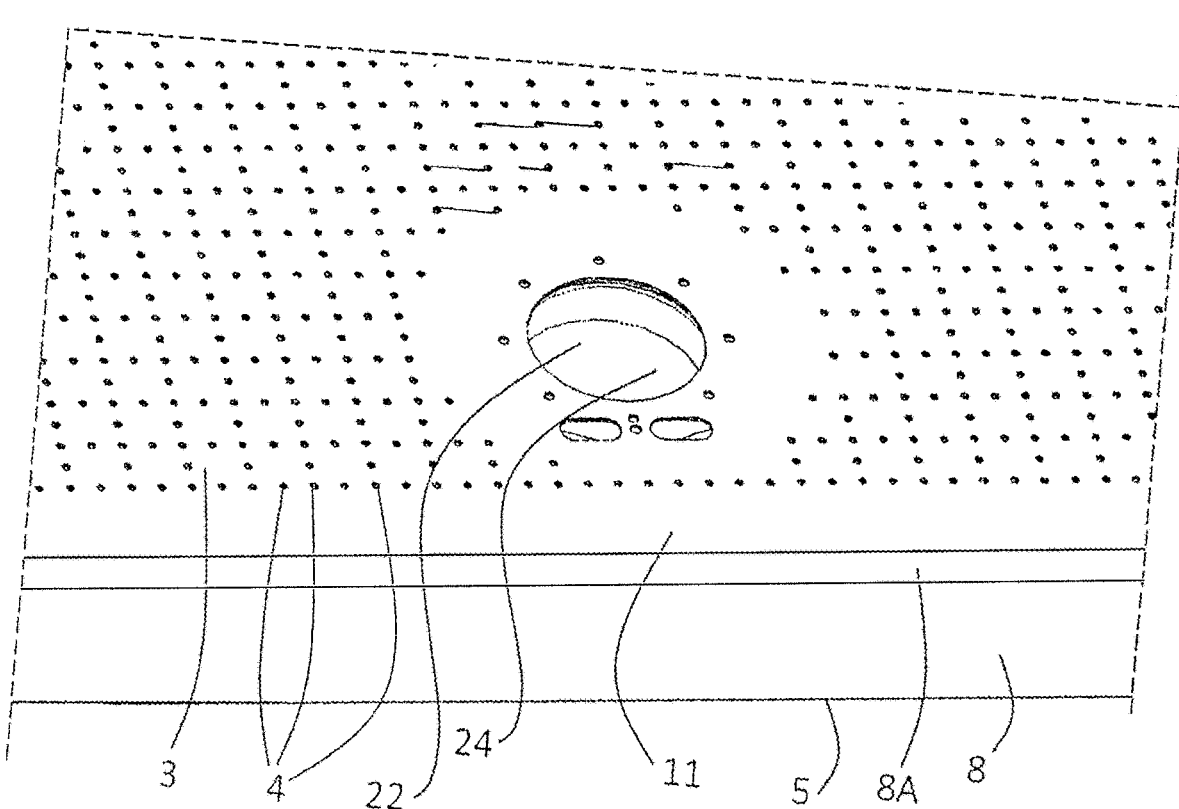
FIG. 3 schematically illustrates, in a perspective view, a detail enlargement of elements of the retention device of FIG. 1, circled by dashes in this figure, with the difference that the tight well and the elements within the latter are not shown.

Said bottom 6 has for example the shape of a plate, as illustrated in particular in FIG. 2. Said bottom 6 is in particular intended to be supported on the interior floor 2 of the vehicle. Advantageously, said storage tank 5 comprises at least one tank edge 8, said tank edge 8 being designed to retain the liquid inside said storage tank 5. Obviously, said tank edge 8 preferentially rises from the periphery and/or around said bottom 6. More precisely, said tank edge 8 is connected to said bottom 6, and may be single-piece with the latter. The bottom 6 and the tank edge 8 form in particular a tray (preferably, the one mentioned hereinabove) open upward to the outside, the opening of said tray being preferably designed to receive the upper wall 3, preferably in a removable way. The tank edge 8 preferably rises around the periphery of said upper wall 3, preferably against and connected to the latter. The tank edge 8 rises (vertically), preferably over more than 5 cm, and more preferentially over more than 10 cm. As illustrated in the figures, the tank edge 8 thus advantageously rises up to an flange 8A arranged at an altitude higher than a respective altitude of the upper wall 3, in such a way as to avoid that liquid present on the upper wall 3 flows over the tank edge 8. The storage tank 5 is thus advantageously designed to store the liquid at least using said tank edge 8 and said bottom 6. Said upper wall 3 is advantageously configured to receive the on-board equipment, let the liquid pass into said storage tank 5 thanks to said through-holes 4, and to then retain the liquid within said storage tank 5 by forming a kind of lid on and/or within the latter.

Preferably, said storage tank 5 has, between said projections 7, storage interstices 9 intended to collect the liquid passing through said through-holes 4. Said projections 7 are preferably distributed over more than 60% of said bottom 6, and more preferentially more than 80% of said bottom 6, and even more preferentially more than 90% of said bottom 6. Said storage interstices 9 thus advantageously have a distribution that is similar (and conjugated) to that of said projections 7. Preferentially, said storage interstices 9 communicate (fluidically) with each other, preferably in such a way as to form a storage space formed of a plurality of channels in fluid communication, between said bottom 6 and said upper wall 3. Said storage interstices 9 are obviously advantageously located between said upper wall 3 and said bottom 6. These storage interstices 9 are preferably intended to collect the liquid flowing from said through-holes 4, whereas said projections 7 limit the movements of liquid within the retention device 1, which limits or even prevents the accidental spillage of liquid out of said retention tray 1, in particular during movements of the vehicle, for example an abrupt change of attitude of a helicopter.

Advantageously, the retention device 1 is configured in such a way that said through-holes 4 are mainly, preferably almost totally or totally, opposite said storage interstices 9. Said projections 7 are preferably mainly, more preferentially almost totally or totally, not opposite said through-holes 4. Such a configuration facilitates the flowing of the liquid from the on-board equipment to the storage tank 5 (and more particularly in said storage interstices 9) via said through-holes 4.

Advantageously, said upper wall 3 is intended to extend substantially horizontally. Said bottom 6 is also preferentially intended to extend substantially horizontally. Said tank edge 8 is preferably intended to extend vertically, and it moreover advantageously extends substantially perpendicularly to said bottom 6, although it is also possible that said tank edge 8 is intended to extend substantially obliquely, and extends obliquely with respect to said bottom 6. The retention device 1 is preferably configured so that said bottom 6 and said upper wall 3 extend substantially parallel to each other. Advantageously, said bottom 6 is intended to be supported against the interior floor 2 of the vehicle, substantially parallel to the latter. It may also be considered that the upper wall 3 forms the upper part of the tank 5, whereas the bottom 6 forms the lower part thereof, and the tank edge 8 forms the lateral part. The tank edge 8 advantageously protrudes above the upper wall 3, so as to form a safety stop for the equipment taken on board when the latter is loaded on the upper wall 3 and/or to better retain the liquid within the retention device 1 (higher edges obviously retain more liquid). The preceding and following preferential spatial descriptions (as regards in particular the vertical and horizontal directions) assume by convention that the interior floor 2 of the vehicle is substantially in the horizontal direction, although this is obviously not always true given the frequent attitude changes of said vehicle; it is therefore possible to consider that, by convention, the interior floor 2 of the vehicle is in the horizontal direction (and/or defines the horizontal direction).

Preferably, said upper wall 3 has wall edges 10 connected to said storage tank 5, either permanently (for example, by ultrasound welding, bonding and/or screwing) or removably. More precisely, said wall edges 10 are advantageously connected to the tank edge 8. As illustrated in particular in FIG. 1, said wall edges 10 comprise for example four peripheral sides, including two long sides (substantially parallel) and two short sides (substantially parallel), the long sides being substantially perpendicular to said short sides. The tank side 8 advantageously lines at least partly said wall edges 10. Of course, other shapes are conceivable for the upper wall 3, such as for example that of the upper wall 3 of the embodiment of FIGS. 14 to 18.

Generally, a removable assembly of the upper wall 3 to the storage tank 5, as contemplated as an alternative hereinabove (whether it is through the wall edges 10 of the upper wall 3 or not) offers in particular the possibility to replace the upper wall 3 if necessary, for example in case of wearing, damaging, of the upper wall 3 or also to replace a given upper wall 3 by another upper wall 3 made of a different material and/or a material that would have a different surface aspect (for example, non-skid), more adapted to a particular use desired for the liquid retention device 1. The storage tank 5 may itself remain in position on the interior floor 2 of the vehicle. Moreover, the removable nature of the upper wall 3 provides access to the interior of the storage tank 5, in particular for maintenance and cleaning purpose.

Figure 7:
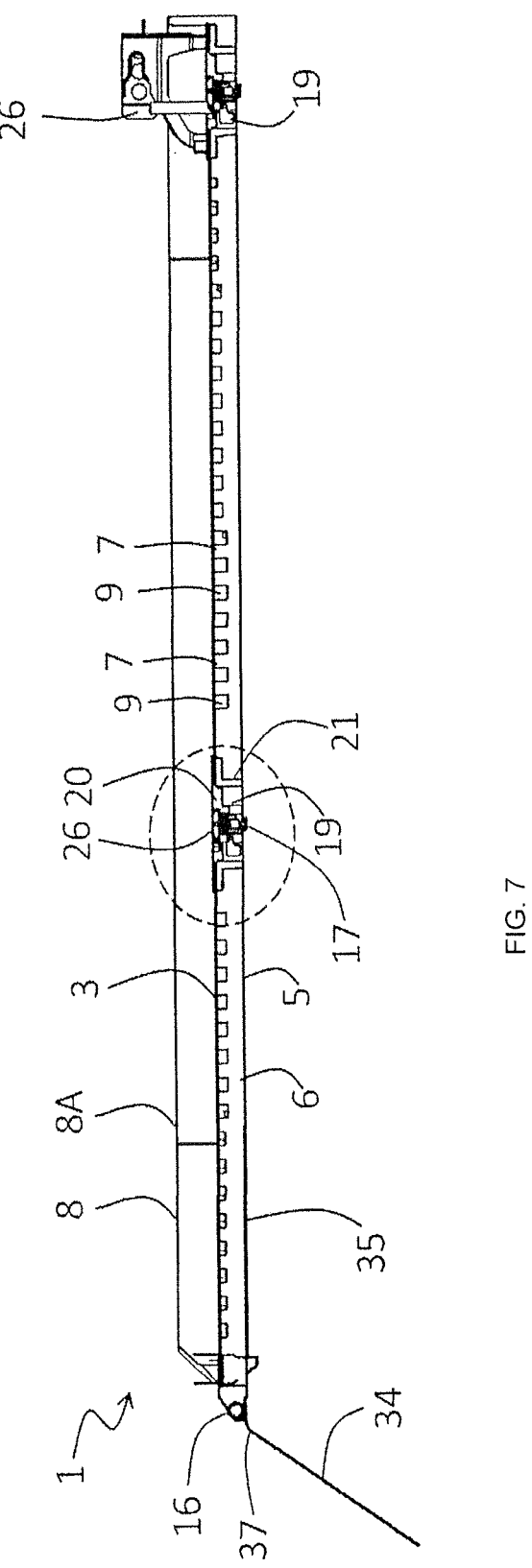
FIG. 7 schematically illustrates a cross-sectional view along a plane A-A of the retention device of FIGS. 1 and 6.
Figure 14:
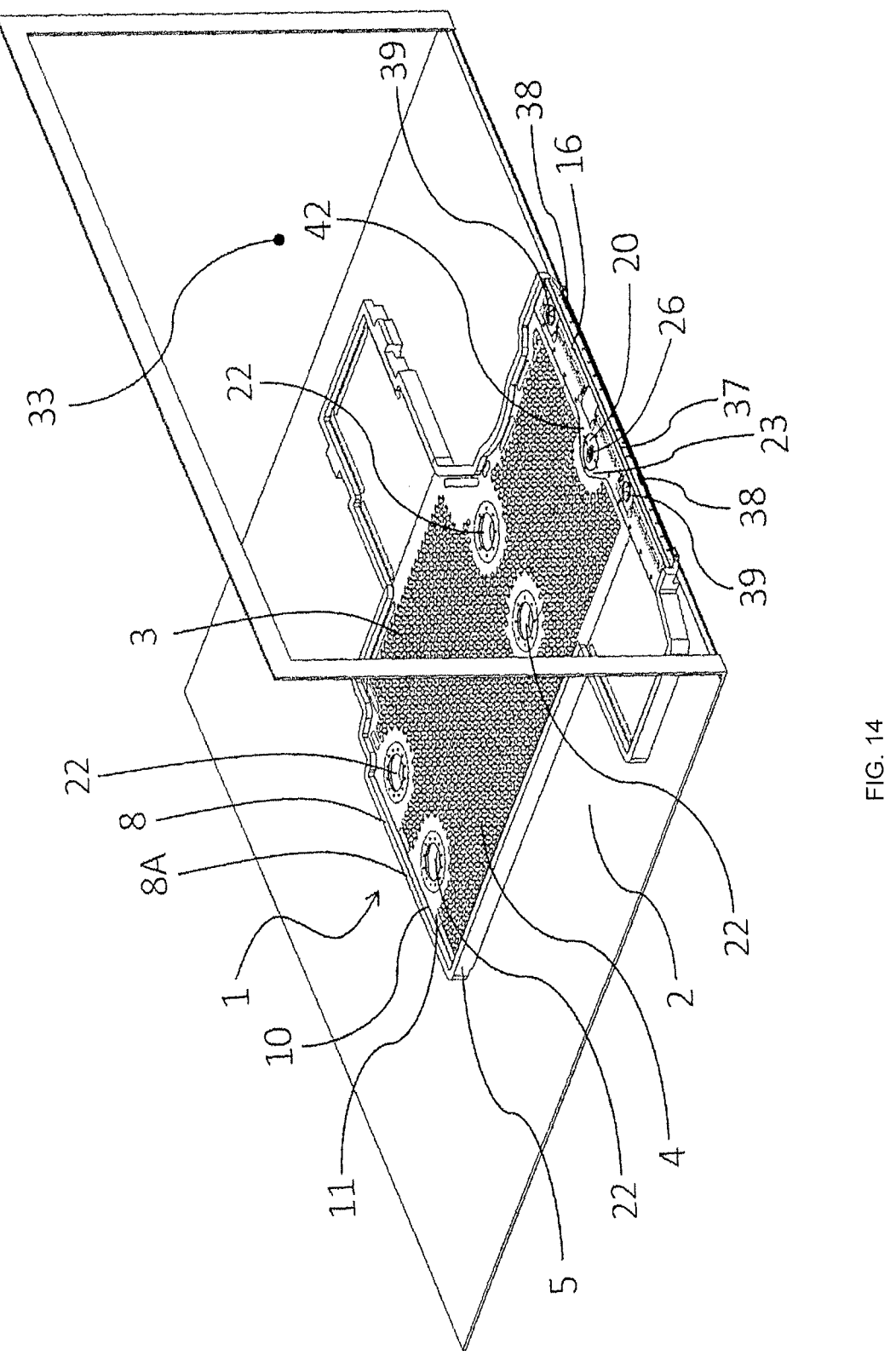
FIG. 14 schematically illustrates, in a top perspective view, a liquid retention device according to the invention in another particular embodiment. The liquid retention device is illustrated carried on the interior floor of a vehicle. Four tight wells have been omitted, to show four through-apertures of the storage tank, each one being intended to receive a tight well within which a fastening means can be positioned to attach the liquid retention device to the interior floor of the vehicle.
Figure 15:
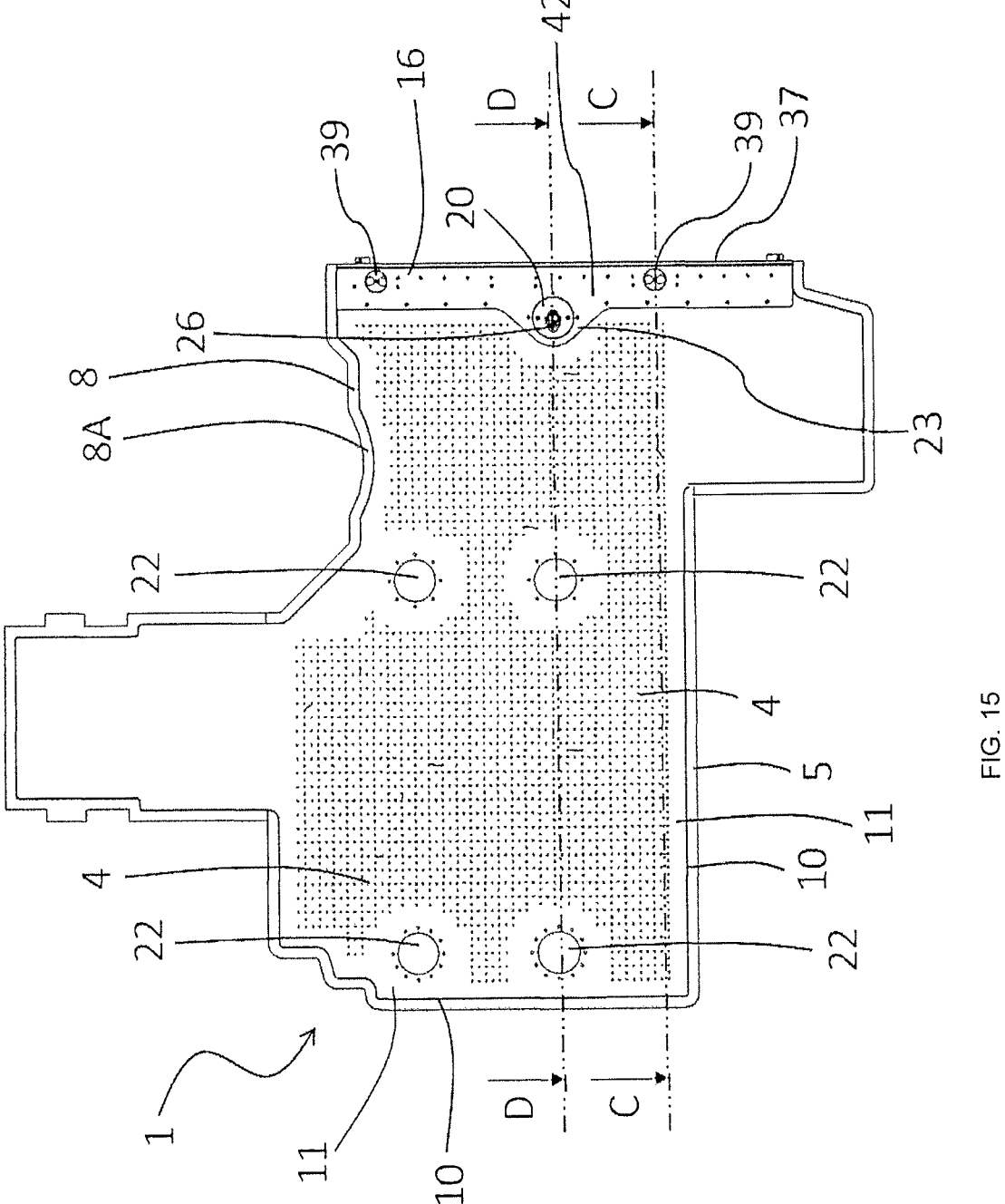
FIG. 15 schematically illustrates, in a top view, the liquid retention device of FIG. 14.
Figure 16:
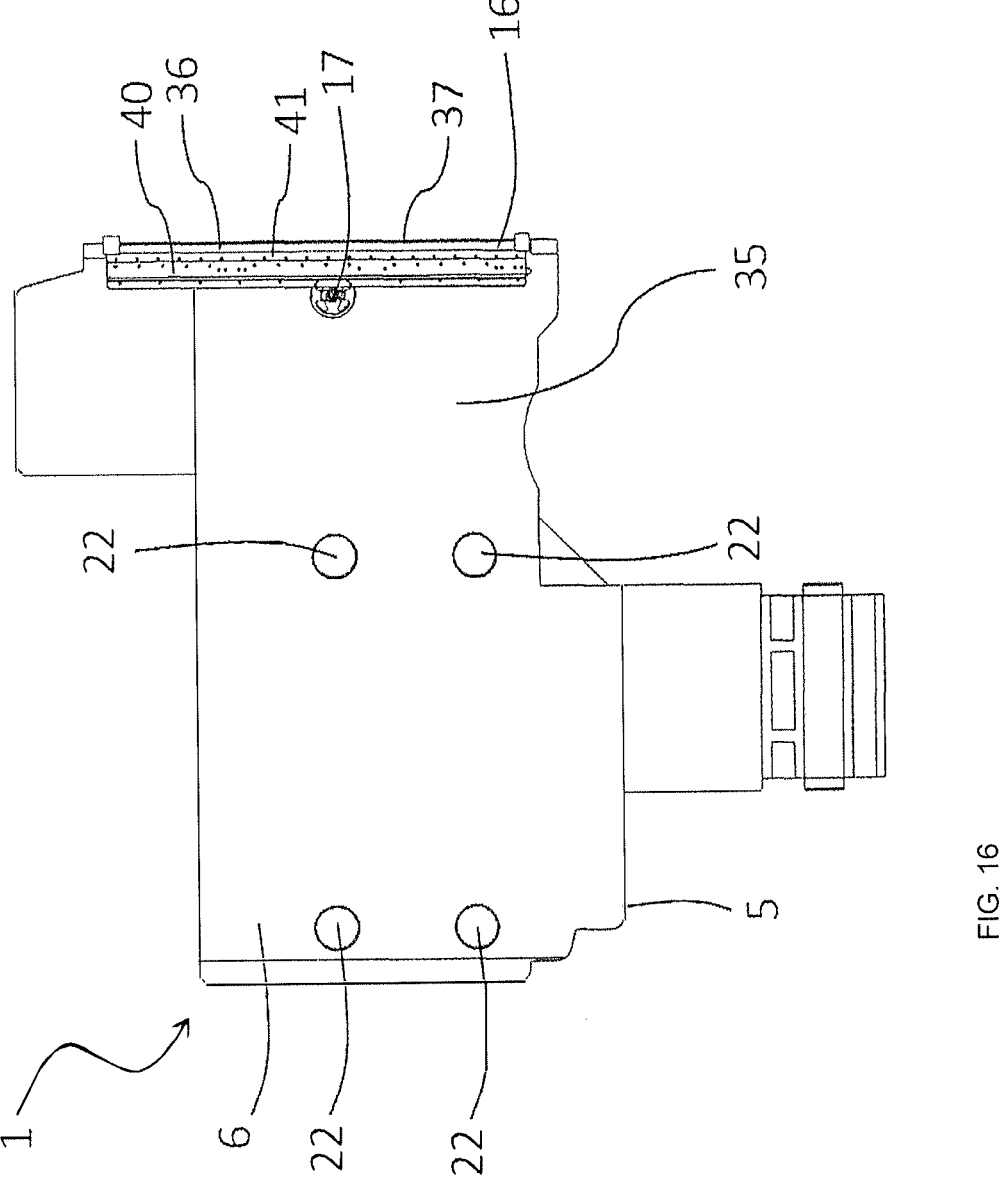
FIG. 16 illustrates, in a bottom view, the liquid retention device of FIGS. 14 and 15.

Preferentially, as illustrated in FIG. 7, said storage interstices 9 have variable depths. In particular, for a given (horizontal) dimension, a plurality of storage interstices 9 located near the wall edges 10 have a lower depth than a plurality of other storage interstices 9 located farther than said wall edges 10. Such a configuration provides a better mechanical strength to the liquid retention device 1, and above all makes it possible to retain a significant proportion, and in particular most, of said liquid in a central area of said storage tank 5, which significantly limit the risk of unwanted spillage of liquid from the retention device 1 (and hence on the interior floor 2) upon an abrupt movement or a sudden tilting of the vehicle. The depth is preferably measured in alignment with the upper wall 3.

Particularly advantageously, said upper wall 3 has a surface 11 devoid of through-holes 4 extending from said wall edges 10. Said surface 11 devoid of through-holes 4 advantageously forms a peripheral portion 11 of said upper wall 3, said peripheral portion 11 preferably going (all)

around said upper wall 3. Therefore, said surface 11 devoid of through-holes 4 advantageously extends in alignment with each wall edge 10 over a respective edge distance D from said wall edge 10. Said edge distance D is for example of at least 5 cm, preferably at least 7 cm, for example at least 10 cm (+/−1 cm). According to an advantageous embodiment, said edge distance D is higher than or equal to $\frac{1}{10}^{th}$, preferably higher than or equal to $\frac{1}{8}^{th}$, of the dimension of the upper wall 3 considered in alignment with said wall edge 10, for example the width or the length of said upper wall 3. For example, in alignment with each wall edge 10 having the width of said upper wall 3, said surface 11 devoid of through-holes 4 extends over at least an edge distance D that is equal to at least $\frac{1}{6}^{th}$ of the width of the upper wall 3, from the wall edge 10.

Preferably, said storage tank 5 is at least partly made of closed-cell foam. Particularly advantageously, said projections 7 (which are thus part of the storage tank 5) are made of said foam. Said bottom 6 may also be at least partly made of said foam. Said closed-cell foam preferentially has a density between 30 and 120 kg/m³, preferably between 35 and 80 kg/m³, for example of about 47 kg/m³ (+/−3 kg/m³). The upper wall 3, that is advantageously supported on the projections 7, as can be seen in FIGS. 7 and 8, is thus preferentially designed to bear against said foam, the set of projections 7 formed of said foam offering a particularly stable support to said upper wall 3, as well as a potential cushioning which is particularly appreciable at the time of positioning the equipment on the upper wall 3, in particular when the equipment is a soaked stretcher carrying a rescued individual potentially injured or unwell, who needs to be handled carefully. Said storage tank 5 may be at least partly made of polymer (a closed-cell foam as that mentioned hereinabove, for example, or another one), such as a polyester, the polymer having preferably a good resistance and its own mechanical strength as long as it has a certain thickness (one cm or more, for example). Particularly advantageously, said projections 7 (which are thus part of the storage tank 5) are made of said polymer (or of several polymers). Such a configuration, with the foam and/or the polymer, provides the retention device 1 with an excellent liquid storage capacity, a good mechanical resistance, as well as a reduced mass. Said storage tank 5 may also or as a complement be at least partly made of a metal, for example aluminium and/or steel. It is preferable that the retention device 1 remains rather light-weight, especially when it is fastened to the interior floor 2 of an aircraft.

Figure 4:
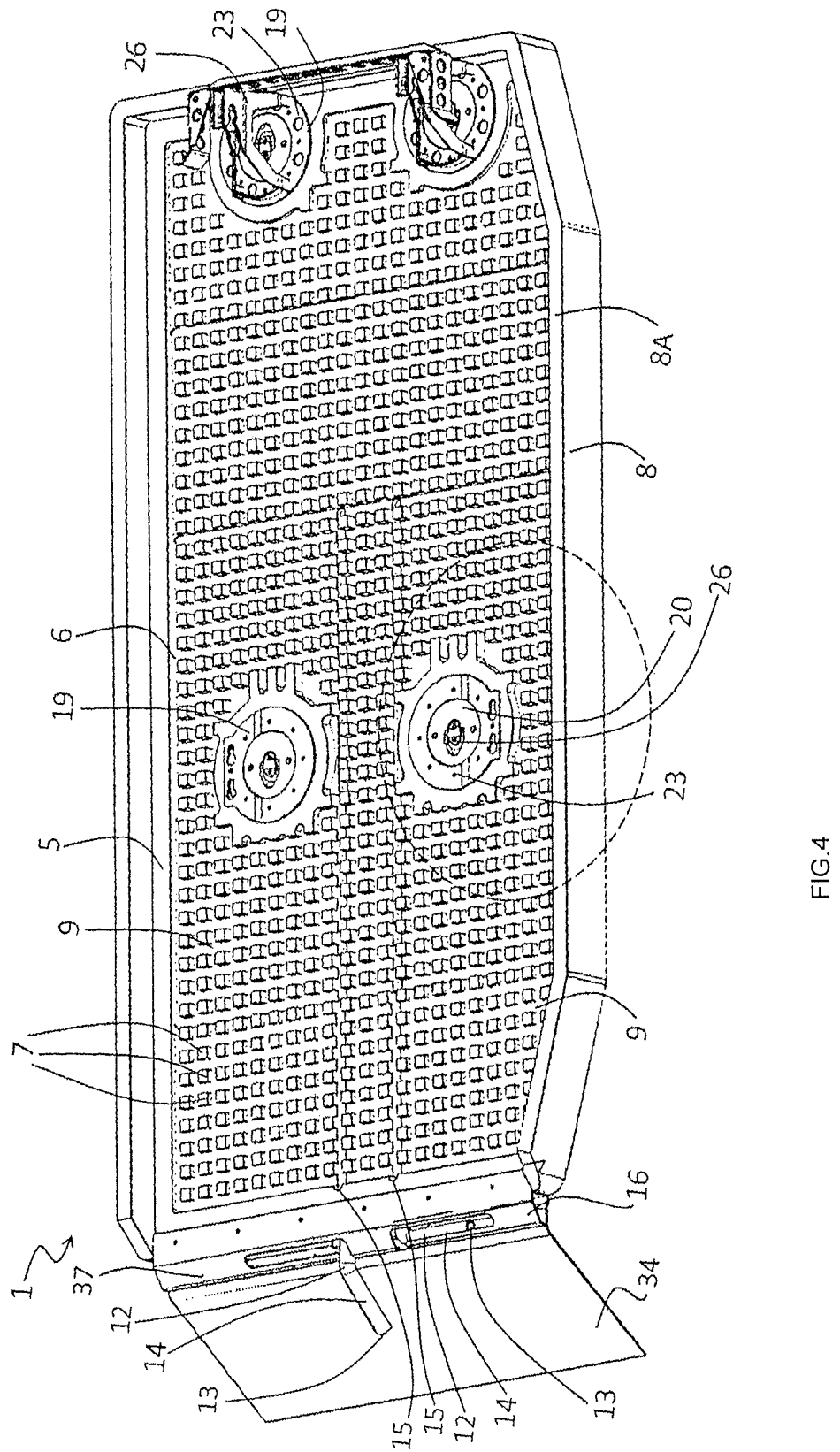
FIG. 4 schematically illustrates, in a top perspective view, the liquid retention device of FIG. 1, with the difference that it is illustrated without the upper wall.
Figure 5:
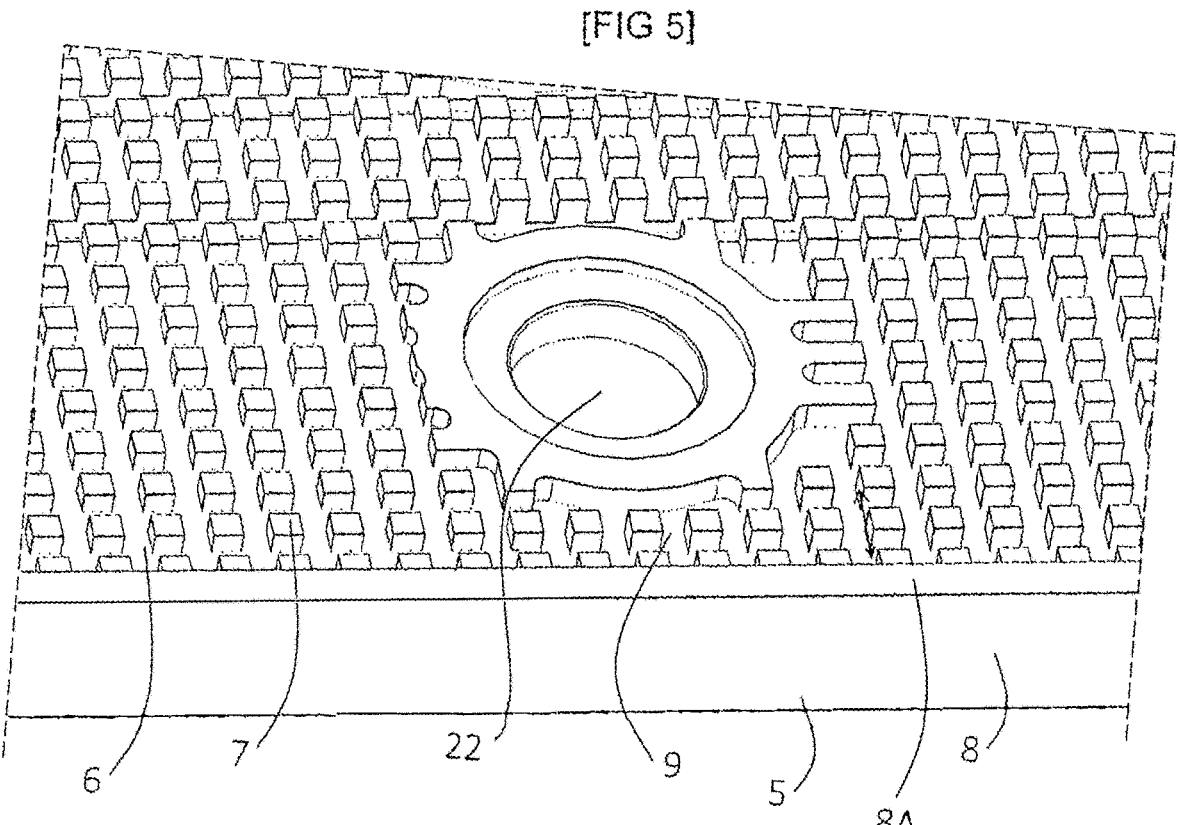
FIG. 5 schematically illustrates, in a perspective view, a detail enlargement of elements of the retention device of FIG. 4, circled by dashes in this figure, with the difference that the tight well and the elements within the latter are not shown.
Figure 6:
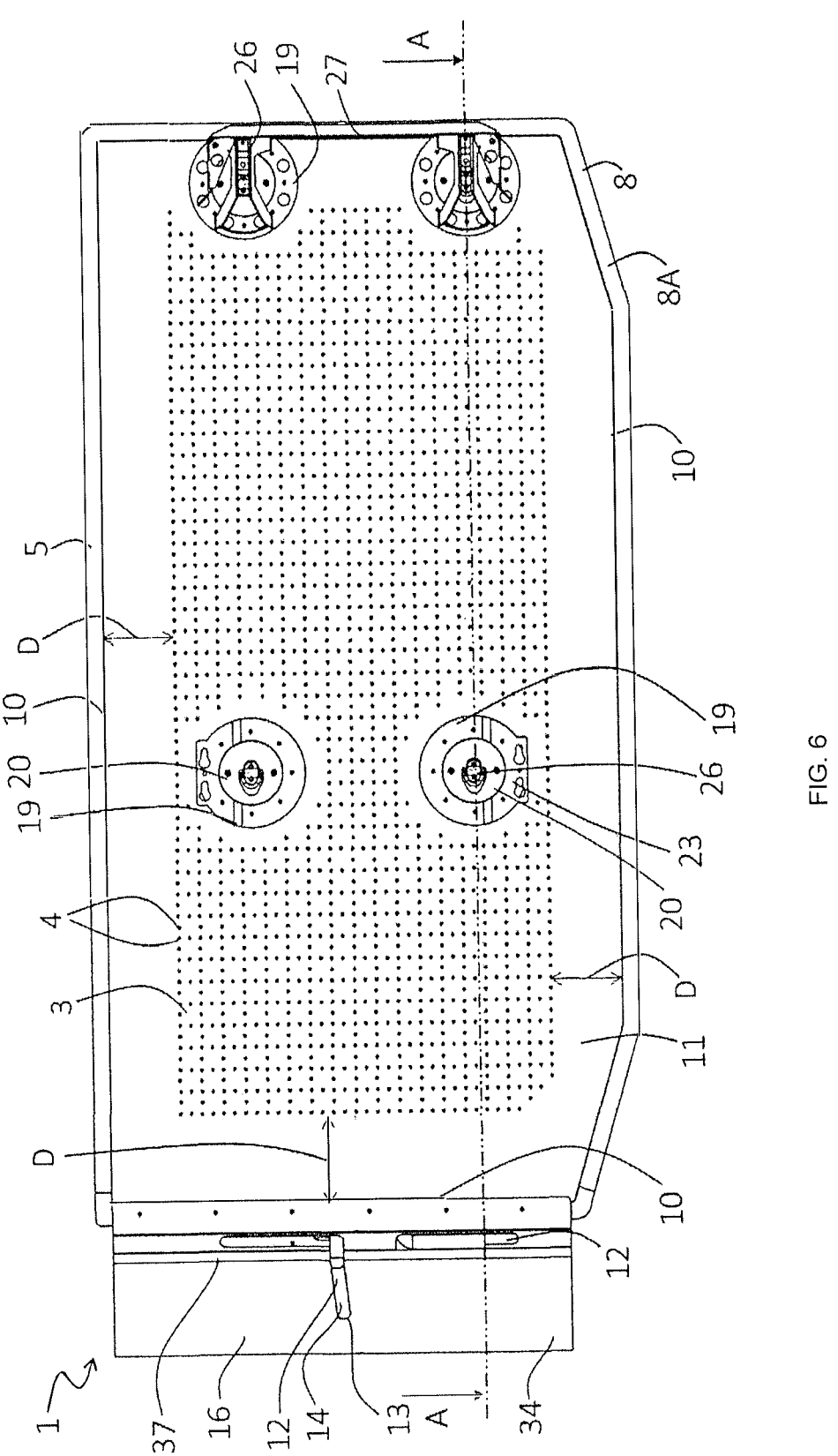
FIG. 6 schematically illustrates, in a top view, the liquid retention device of FIG. 1.

Preferably, the storage tank 5 comprises at least one draining means 12, which comprises at least one hole 13 (or draining hole) opening to the outside (of the storage tank 5), as well as an opening/closing member to selectively control the draining of the liquid collected by the storage tank 5 out of the latter, through said hole 13. As an alternative, implemented in the embodiment of FIGS. 1 to 13, the opening/closing member may include a removable means (not shown) for plugging said through-hole 13. Said through-hole 13 is configured in such a way that, when unplugged or at least put in fluid communication with the inside of the storage tank 5 after operation of the opening/closing member, the liquid collected by the storage tank 5 is allowed to flow out of the latter. The draining means 12 comprises for example, as illustrated in particular in FIG. 1, a duct 14 having a first end 15 leading inside the storage tank 5 and a second end 13, opposite the first end 15 and leading outside the tank, the second end 13 forming for example the through-hole 13 as illustrated in FIG. 4. As an alternative, the first end 15 forms the through-hole 13, but it could also be contemplated that the duct 14 itself forms the through-hole 13. As another alternative, implemented in the embodiment of FIGS. 14 to 18, the opening/closing member may include a gate-valve 32. In this alternative, and as illustrated as an example in FIG. 17, the draining means 12 may typically comprise a duct 14 having a first end 15 leading inside the storage tank 5 and a second, opposite end, connected to an inlet of the gate-valve 32, an outlet of the gate-valve 32 then advantageously forming the through-hole 13.

The first end 15 is for example formed or arranged in the bottom 6 and/or the tank edge 8. Such a configuration makes it possible to empty the storage tank 5 from its liquid as soon as possible, for example when the vehicle moves, and in particular during the evacuation of a rescued individual (for example, at sea) and placed on a stretcher (which then at least partly constitutes the equipment). Of course, the draining means 12 may comprise several ducts 14 (for example, two) such as that mentioned hereinabove.

Preferably, the liquid retention device 1 comprises a protective stringer 16 (or protective flange) secured to an edge (or a side) of the storage tank 5 (or at the very least assembled to said edge), in order to protect the latter, in particular from a crushing caused by said equipment when the latter is placed onto the retention device 1. Indeed, the equipment is often "thrown" on the retention device 1 or violently slid thereon, in particular at the time when the equipment is docked to the upper wall 3, which is often made without precaution due to the particular circumstances (emergency during evacuation of a person, unstable helicopter attitude, equipment heaviness in particular when it comprises a stretcher carrying an individual, positioning of a heavy and cumbersome passenger seat, etc.). Advantageously, the liquid retention device 1 is intended to be taken on board the vehicle with the protective stringer 16 directed opposite an opening 33 of the vehicle, as illustrated by way of example in FIG. 14. Said protective stringer 16 thus advantageously forms a "bumper" or a protective step for the edge of the storage tank 5 against which the equipment to be taken on board will come into contact, and possibly in rest, when said equipment is introduced into the vehicle through the opening 33 of the latter. It is moreover conceivable to provide that the protective stringer 16 follows substantially the whole contour of the storage tank 5, and not only part of the latter as in the embodiments illustrated in the figures.

Preferably, said protective stringer 16 is made of metal (such as aluminium, steel or an alloy), of polymer and/or of wood. The material forming said protective stringer is preferentially solid, and has in particular an excellent crush resistance, in particular a better crush resistance than the rest of the retention device 1, and in particular a better crush resistance than said foam. According to a particular example illustrated in particular in FIG. 1, said protective stringer 16 comprises a plate-shaped portion 34, preferably configured to be placed on the interior floor 2 of the vehicle, and/or to be positioned at an opening of the vehicle. Advantageously, said plate-shaped portion may form a ramp or a flank 34, for example to facilitate the loading of the equipment on the liquid retention device 1 from the outside of the vehicle and/or to guide the flow of liquid out of the storage tank 5 through the through-hole 13 of the draining means 12, for example towards the outside of the vehicle. Said draining means 12 is for example positioned at a portion of said protective stringer 16, and in particular on or in the latter.

Such a configuration allows hiding at least partly, and/or storing, said draining means 12, and in particular said duct 14.

According to an alternative of the invention, the liquid retention device 1 comprises at least one fastening means 17 configured to attach, preferably in a reversible way, the retention device 1 to the interior floor 2 of the vehicle, and in particular to a lashing rail 18 fitted to said interior floor 2. The implementation of such a fastening means 17 allows limiting, and preferably totally preventing, a relative movement between the liquid retention device 1 and the interior floor 2 of the vehicle, in particular as a result of movements (such as in particular a change of tilt angle and/or an acceleration) of the moving vehicle. This allows in particular a practical, reliable and secure implementation of the liquid retention device 1. The fastening device 17 comprises for example a pin with a head designed to engage and then lock reversibly into said lashing rail 18, such a locking being known as such. The lashing rail 18 is preferably secured to the interior floor 2 of the vehicle, for example using screws and welds. As an alternative, the lashing rail 18 may be directly arranged in the interior floor 2 of the vehicle.

Preferentially, the liquid retention device 1 comprises at least one liquid-tight well 19, which passes through said upper wall 3 and said storage tank 5. Advantageously, said fastening means 17 is positioned within said tight well 19. This advantageously allows fastening the liquid retention device 1 to the interior floor 2 of the vehicle, through the storage tank 5, without hampering the tightness of the latter. This further allows a particularly easy, practical and efficient fastening of the liquid retention device 1 to the interior floor 2 of the vehicle, in particular to a lashing rail 18 fitted to said interior floor 2, and that, advantageously, irrespective of the size and shape of the liquid retention device 1. In particular, it is then possible to design a liquid retention device 1 having such a size that it can cover substantially the whole surface of the interior floor 2 of the vehicle in order to protect at best said interior floor 2 and which may however be easily fastened to a lashing rail 18 of the interior floor 2. Advantageously, the liquid retention device 1 may comprise a plurality of tight wells 19, which are arranged relative to each other with a centre distance corresponding to a respective centre distance of a plurality of lashing rails 18 that may be fitted to the interior floor 2.

The liquid retention device 1 moreover advantageously comprises a removable plug 20 configured to seal said tight well 19 in a liquid-tight manner, said plug 20 being configured to be placed in and/or or said tight well 19 from the outer side of the upper wall 3. The tight well 19 comprises for example at least one first collar-shaped flange 21 inserted in a first through-opening 22 of the storage tank 5, wherein said first through-opening 22 does not communicate with said storage interstices 9. The tight well 19 comprises in particular a second flange 23, in such a way that the upper wall 3 is clamped between said first and second flanges 21, 23, this clamping being made about a second through-opening 24 of the upper wall 3. The second flange 23 may be, for example, in the form of a (flat) ring. Said first and second through-openings 22, 24 are of course advantageously matched with each other. Such an arrangement is illustrated in particular in FIG. 8. Advantageously, the plug 20 is configured to be at least partly fastened in said tight well 19, advantageously removably, preferably on the side of said second flange 23 (that is to say from the outer face of the upper wall 3, and not from the outer face of the bottom 6). The plug 20 comprises for example a third disc-shape flange as well as an O-ring 25 surrounding said third flange, said O-ring 25 being designed to ensure the liquid-tightness between said third flange and said first flange 21 (and more generally between the plug and the tight well 19). Said plug 20 preferentially isolate said fastening means 17 within said tight well 19 with respect to the top of the retention device 1. Said plug 20 is preferentially configured to be removably attached to said fastening means 17, on the top of the latter. Such a configuration allows in particular to avoid the fastening means 17 and/or the interior floor 2 to be soaked by said liquid. The tight well 19 is advantageously liquid tight at its lateral edges, but that is preferably the plug 20 that completes the tightness of said tight well 19, for example at an open end of the latter. Obviously, said retention device 1 may comprise several tight wells 19 such as that described hereinabove, and in particular at least four tight wells 19. This allows contemplating a fastening of the liquid retention device 1 to the interior floor 2 of the vehicle at several points, through a plurality of fastening means 17, each positioned within one of said tight wells 19. It is also possible to provide that the tight well 19 or one at least of the tight wells 19 contains no fastening means 17, but is intended to serve as storage accommodation, for intervention equipment for example.

As another alternative of the invention, the liquid retention device 1 comprises, in addition to said fastening means 17 or instead of the latter, at least one attachment means 26 configured to attach, preferably reversibly, said retention device 1 to said on-board equipment. In other words, the liquid retention device 1 comprises an attachment means 26 configured to attach, at least temporarily, the equipment taken on board to the liquid retention device 1 and to therefore limit (if not totally prevent) the risk of relative movement between the equipment taken on board and the liquid retention device 1, in particular as a result of movements (such as in particular a change of tilt angle and/or an acceleration) of the moving vehicle. Said attachment means 26 thus advantageously makes it possible to secure the equipment taken on board in position on the upper wall 3 of the liquid retention device 1 in order, in particular, to prevent liquid from dripping out of the liquid retention device 1, typically to the interior floor 2 of the vehicle. Advantageously, said attachment means 26 is distinct from the through-holes 4 of the upper wall 3 and from said upper wall 3, so that in particular the set of through-holes 4 remains advantageously free to allow liquid flowing towards the storage tank 5. According to a particular embodiment, illustrated in FIGS. 1 to 10, said attachment means 26 is positioned at least in part within said tight well 19 or on the latter. Said attachment means 26 is preferentially designed to be attached to said tight well 19, and that preferably in a reversible way. According to a particular embodiment, compatible with the preceding one, said plug 20 carries said attachment means 26. According to another particular embodiment, also compatible with the preceding ones, the attachment means 26 is configured to be fastened to said tight well 19, and in particular to be fastened to said second flange 23, and possibly on the latter. Said attachment means 26 may possibly comprise a fastening rod 27 connecting two tight wells 19, said fastening rod 27 being for example configured to receive the equipment, in particular a stretcher. Preferably, the liquid retention device 1 comprises a device passing through both said upper wall 3 and said storage tank 5, said through-device forming both said fastening means 17 and said plug 20, as well as possibly said attachment means 26.

To sum up, advantageously, the fastening means 17 is fastened (removably) to the lashing rail 18 itself fastened (permanently) to the floor 2, the fastening means 17 being moreover preferably attached to said tight well 19, whereas the plug 20 is advantageously fastened (removably) to said tight well 19 and/or to said fastening means 17, and said attachment means 26 is itself fastened (removably) to said plug 20 and/or to said tight well 19. Such a configuration provides the retention device 1 with an excellent reliability as regards its fastenings to the equipment and/or to the floor 2, because the equipment is indirectly connected to the floor 2 and the floor 2/retention device 1 connection formed by the lashing rail 18 and the fastening means 17 is kept dry, protected from the liquid. Advantageously, the plug 20 is removable, the retention device 1 is configured in such a way that it is possible to remove the plug 20 from the well 19. This provides access to the fastening means 17 within the well 19, advantageously in order to lock or unlock the latter with respect to the lashing rail 18.

According to a particular alternative of the invention, illustrated in FIGS. 11 to 13, the liquid retention device 1 comprises, below the upper wall 3 and in the storage tank 5, an absorption means 28, such as a sponge material, configured to absorb the liquid flowing from said through-holes 4. As described hereinabove, the storage tank 5 preferably comprises a bottom 6, which advantageously has the shape of a plate. The retention device 1 advantageously comprises, according to the particular embodiment mentioned hereinabove, a pressing means 29, 30, 31 configured to press said absorption means 28 against said bottom 6 in order to extract the previously absorbed liquid from said absorption means 28. In particular, the pressing means 29, 30, 31 comprises at least one pressing plate 29 positioned between said upper wall 3 and said absorption means 28. Said pressing plate 29 is thus preferably substantially flat, and intended to press the absorption means 28 against the bottom 6 to get the absorbed liquid out of it. Said absorption means 28 is for example formed by a layer of sponge material of a certain thickness, having for example a generally rectangular or round shape, interposed between said bottom 6 and said pressing plate 29. Preferentially, said pressing means 29, 30, 31 comprises at least one actuator 30, for example a pneumatic or hydraulic cylinder, said actuator 30 being connected to said pressing plate 29. Said actuator 30 is moreover advantageously connected to said upper wall 3. In other words, an end of the actuator 30 is connected to the upper wall 3, whereas the opposite end is connected to the pressing plate 29. Therefore, the actuator 30 is preferably configured to be operated in such a way as to bear against said upper wall 3 to push said pressing plate 29 against said absorption means, in order to press the latter against said bottom 6. The pressing means 29, 30, 31 comprises for example a hydraulic, pneumatic or oleopneumatic (or also electric) system 31 for operating said actuator 30. Obviously, said pressing means 29, 30, 31 may comprise several actuators 30 as that mentioned hereinabove, for example at least four actuators 30.

According to a particular alternative of the invention, not illustrated but very similar to the previous alternative, said absorption means 28 is arranged within said storage interstices 9. In this case, the absorption means 28 has advantageously the shape of a grid, and is for example formed by a grid of sponge material. Said pressing plate 29 is then preferentially arranged within said storage interstices 9. Said pressing plate 29 has then also a shape that is preferably that of a grid, and is for example formed by a grid of metal or polymer.

Advantageously, the liquid retention device 1 has a lower face 35 that is intended to come opposite the interior floor 2 of the vehicle, when the liquid retention device 1 is carried on said interior floor 2 and that is provided at least locally with a sealing gasket 36 (or "barrier element"), in particular against liquid. Said sealing gasket 36 is advantageously intended to be interposed between the lower face 35 of the liquid retention device 1 and the interior floor 2 of the vehicle, in compression against the interior floor 2, when the liquid retention device 1 is carried on said interior floor 2. The implementation of such a sealing gasket 36 advantageously makes it possible to limit, if not totally prevent, the infiltration of liquid and/or various impurities (mud, dust, etc.) between the liquid retention device 1 and the interior floor 2. Indeed, such an infiltration would be in particular liable to generate problems of vehicle soiling, or even corrosion of the interior floor 2. According to an alternative (not illustrated), the sealing gasket 36 may follow substantially the whole peripheral contour of the lower face 35 of the liquid retention device 1. According to another alternative (not illustrated), the sealing gasket 36 may cover substantially the whole surface of the lower face 35 of the liquid retention device 1. According to still another alternative, which will be detailed hereinafter in connection with the embodiment of FIGS. 14 to 18, the sealing gasket 36 may be arranged locally at a particular area of the lower face 35 of the liquid retention device 1, in particular in the vicinity of the draining means 12 of the storage tank 5, in order to limit in particular the risk of infiltration of liquid exiting through the hole 13 of the draining means 12 between the liquid retention device 1 and the interior floor 2. According to an advantageous alternative as regards the simplicity of design and implementation, the sealing gasket 36 is made of an elastically and/or plastically deformable material, so that the sealing gasket 36 is deformed by compression against the interior floor 2, which thus also provides an excellent tightness.

It is to be noted here that an invention in its own right is consisted by a liquid retention device 1 intended to be carried on the interior floor 2 of a vehicle and designed and configured to receive a piece of equipment taken on board said vehicle, for example a seat or a stretcher, in particular during an evacuation mission, the liquid retention device 1 comprising at least:

an upper wall 3 designed and configured to support said equipment, said upper wall 3 being provided with a plurality of through-holes 4, a liquid storage tank 5 at least partly arranged below said upper wall 3, said storage tank 5 being designed and configured to collect the liquid passing through said through-holes 4, a lower face 35 provided at least locally with a sealing gasket 36, which is intended to be interposed between said lower face 35 and the interior floor 2 of the vehicle, in compression against said interior floor 2, when the liquid retention device 1 is carried on said interior floor 2.

Such a liquid retention device 1 would not necessarily comprise an attachment means 26 configured to attach, preferably in a reversible way, said liquid retention device 1 to said on-board equipment, and/or a fastening means 17 configured to attach, preferably in a reversible way, the retention device 1 to the interior floor 2 of the vehicle, and in particular to a lashing rail 18 fitted to said interior floor 2.

Advantageously, the liquid retention device 1 is designed and configured in such a way that the compression of the sealing gasket 36 against the interior floor 2 of the vehicle results not only from the own weight of the liquid retention device 1 but also from the implementation of the one or several means 17 for fastening the retention device 1 to the interior floor 2 of the vehicle (such as for example in the embodiment of FIGS. 14 to 18). In other words, said fastening means 17 is then provided to fasten the retention device 1 to the interior floor 2 of the vehicle while ensuring the compression of the sealing gasket 36 against the interior floor 2. According to the design and configuration of the sealing gasket, other suitable means (alternative or complementary to said fastening means 17) for compressing the sealing gasket 36 against the interior floor 2 could also be contemplated.

According to a particularly advantageous alternative, the liquid retention device 1 is designed and configured to ensure the draining of the liquid collected by the storage tank 5 out of the liquid retention device 1 through the above-mentioned draining means 12, towards the front of the protective stringer 16, that is to say advantageously towards the front of an outer lateral face 37 of the protective stringer 16 that is directed towards the outside of the liquid retention device 1. According to this alternative, the protective stringer 16 then advantageously defines a portion of the lower face 35 of the liquid retention device 1 that carries said sealing gasket 36. In other words, the sealing gasket 36 is then located at the protective stringer 16. A backflow of the liquid towards the rear of the protective stringer 16, between the liquid retention device 1 and the interior floor 2 of the vehicle, during the draining of the storage tank 5, is thus advantageously avoided.

Figure 17:
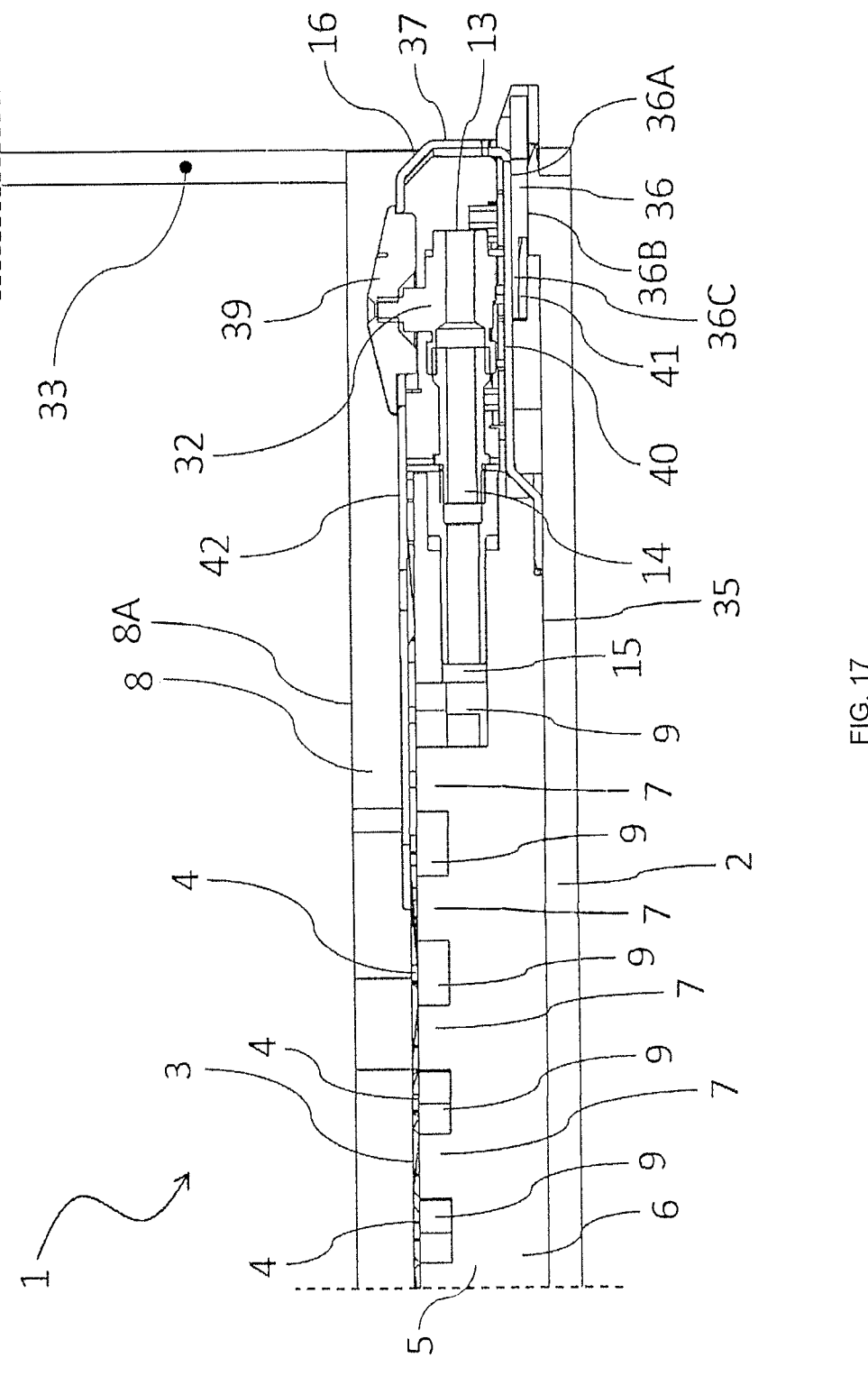
FIG. 17 illustrates, in a truncated cross-sectional view along a plane C-C (see FIG. 15), a portion of the liquid retention device of FIGS. 14 to 16.
Figure 18:
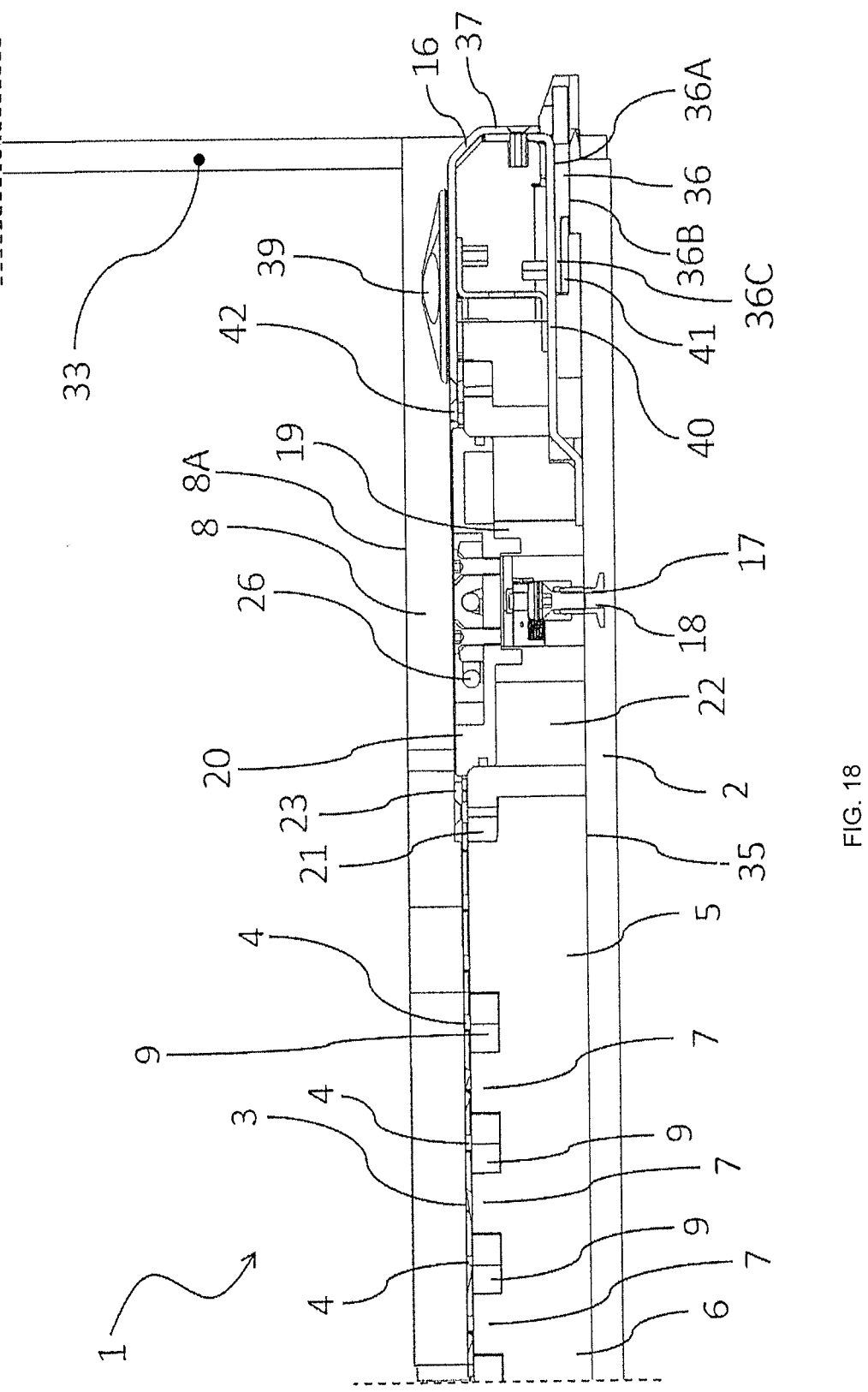
FIG. 18 illustrates, in a truncated cross-sectional view along a plane C-C (see FIG. 15), a portion of the liquid retention device of FIGS. 14 to 17.

For example, in the embodiment illustrated in FIGS. 14 to 18, the protective stringer 16 is in the form of a rigid sub-unit having a substantially "C"-shaped cross-section. The branches of the "C" shape are directed towards the storage tank 5, whereas the belly of the "C" shape is directed towards the outside of the liquid retention device 1 and thus defines the lateral outer face 37 of the protective stringer 16 mentioned hereinabove. In this example, the draining device 12 comprises two ducts 14, and the opening/closing member comprises two gate-valves 32, each associated with one of the ducts 14. The ducts 14, their through-holes 13 and the gate-valves 32 are here housed inside the protective stringer 16 and are hence advantageously mechanically protected by the latter. The outer lateral face 37 of the protective stringer 16 is provided with through-openings 38 to allow the liquid flowing through the through-holes 13 to flow towards the front of the protective stringer 16. The opening/closing member further comprises a manual operation means 39, arranged on an outer upper face of the protective stringer 16, for controlling the opening and closing of the gate-valves 32. As illustrated in particular in FIGS. 16 to 18, the protective stringer 16 advantageously comprises a lower wing 40, which defines a portion of the lower face 35 of the liquid retention device 1, and that carries the sealing gasket 36. The protective stringer 16 is here screw-secured to the storage tank 5 through the lower wing 40 thereof. The latter sealing gasket 36 is, in this non-limiting example, in the form of an elongated blade or plate made of an elastically deformable material (for example, an elastomeric material). With an upper sealing face 36A and an opposite lower sealing face 36B, the sealing gasket 36 extends longitudinally along a longitudinal direction of extension of the protective stringer 16. The upper sealing face 36A of the sealing gasket 36 is here applied in tight contact against a lower outer face of the lower wing 40 and firmly held in position, at a fastening tab 36C of the sealing gasket 36, using a holding plate 41 screw-secured to the lower wing 40 of the protective stringer 16. Let free, the lower sealing face 36B is intended to come into contact with a corresponding surface of the interior floor 2 (FIGS. 17 and 18).

In order to ensure the fastening of the liquid retention device 1 to the interior floor 2 of the vehicle while ensuring a compression of the sealing gasket 36 against the interior floor 2 as mentioned hereinabove, the liquid retention device 1 advantageously comprises at least one tight well 19, within which is positioned a fastening means 17, as already contemplated hereinabove. The second flange 23 of the tight well 19 is here advantageously formed by a portion of an upper wing 42 of the protective stringer 16. Thus, during the positioning of the liquid retention device 1 on the interior floor 2 of the vehicle, the tight well 19 may advantageously be positioned above and opposite a lashing rail 18 of the vehicle. The fastening means 17 is then positioned within the tight well 19, in such a way as to fasten the liquid retention device 1 to the interior floor 2 of the vehicle while compressing the sealing gasket 36 against a corresponding surface of the interior floor 2 (FIGS. 17 and 18).

Obviously, this is only one example of an implementation, and other conformations and/or configurations of sealing gasket 36 and/or protective stringer 16 could be contemplated.

The invention also relates as such, according to a second aspect, to a vehicle comprising an interior floor 2. According to the invention, the vehicle further comprises at least one liquid retention device 1 fitted to said interior floor 2, said liquid retention device 1 being designed and configured to receive a piece of equipment taken on board said vehicle, for example a seat or a stretcher, in particular during an evacuation mission, and comprising at least:

an attachment means 26 configured to attach, preferably in a reversible way, said liquid retention device 1 to said on-board equipment, and/or a fastening means 17 configured to attach, preferably in a reversible way, the retention device 1 to the interior floor 2 of the vehicle, and in particular to a lashing rail 18 fitted to said interior floor 2, an upper wall 3 designed and configured to support said equipment, said upper wall 3 being provided with a plurality of through-holes 4, and a liquid storage tank 5 at least partly arranged below said upper wall 3, said storage tank 5 being designed and configured to collect the liquid passing through said through-holes 4.

Thus, the above description of the liquid retention device 1 advantageously also applies to the vehicle according to the invention, and vice versa. Said vehicle thus advantageously comprises at least one liquid retention device 1 as described hereinabove, but it may also comprise several liquid retention devices 1 in accordance with what has been mentioned hereinabove. The vehicle comprises for example a plurality of liquid retention devices 1 (preferably similar to each other) covering at least part, and possibly the totality, of the interior floor 2 of the vehicle. Each liquid retention device 1 is preferentially fastened to the interior floor 2 of the vehicle, advantageously removably, that is to say that each device may advantageously be attached to and detached from the interior floor 2 at will, possibly manually, that is to say without requiring any tool, in particular using said fastening means 17 and said lashing rail 18. Thus, the vehicle comprises for example one or several lashing rails 18 fitted to said interior floor 2 and each retention device 1 is for example fastened, preferably removably, to one of said lashing rail(s) 18.

The liquid retention device and the vehicle of the invention thus advantageously allow missions to recover persons and/or material soaked by a liquid in optimum safety and comfort conditions both for people, including a rescued individual and rescuers attending to the latter, and for goods, such as electric and electronic equipment of the vehicle.

POSSIBILITIES OF INDUSTRIAL
APPLICATION

The invention finds its industrial application in the design, the manufacturing and the use of liquid retention devices and vehicles fitted with such devices.

The invention claimed is:

1. A liquid retention device (1) intended to be carried on the interior floor (2) of a vehicle and designed and configured to receive a piece of equipment carried on board said vehicle, in particular during an evacuation mission, the retention device comprising at least:

an attachment means (26) configured to attach said liquid retention device (1) to said on-board equipment, and/or a fastening means (17) configured to attach the retention device (1) to the interior floor (2) of the vehicle, and in particular to a lashing rail (18) fitted to said interior floor (2), an upper wall (3) designed and configured to support said equipment, said upper wall (3) being provided with a plurality of through-holes (4), and a liquid storage tank (5) at least partly arranged below said upper wall (3), said storage tank (5) being designed and configured to collect the liquid passing through said through-holes (4).

2. The liquid retention device (1) according to claim 1, characterized in that said liquid storage tank (5) is formed by a tray, which advantageously has its own mechanical strength.

3. The liquid retention device (1) according to claim 1, characterized in that said tank (5) is at least partly made of closed-cell foam.

4. The liquid retention device (1) according to claim 3, characterized in that said closed-cell foam has a density between 30 and 120 kg/m³, preferably between 35 and 80 kg/m³.

5. The liquid retention device (1) according to claim 1, characterized in that said tank (5) comprises at least a bottom (6), from which rise a plurality of projections (7) that are distinct and distant from each other, on which is supported said upper wall (3).

6. The liquid retention device (1) according to claim 5, characterized in that said projections (7) are made of closed-cell foam.

7. The liquid retention device (1) according to claim 5, characterized in that said storage tank (5) has, between said projections (7), storage interstices (9) intended to collect the liquid passing through said through-holes (4).

8. The liquid retention device (1) according to claim 7, characterized in that said storage interstices (9) have variable depths.

9. The liquid retention device (1) according to claim 1, characterized in that the storage tank (5) comprises at least one draining means (12), which comprises at least one hole (13) opening to the outside, as well as an opening/closing member to selectively control the draining of the liquid collected by the storage tank (5) out of the latter.

10. The liquid retention device (1) according to claim 1, characterized in that it comprises a protective stringer (16) secured to an edge of the storage tank (5), in order to protect the latter from a crushing caused by said equipment when the latter is placed on the retention device (1).

11. The liquid retention device (1) according to claim 10, characterized in that said protective stringer (16) comprises a plate-shaped portion, configured to be placed on the interior floor (2) of the vehicle and/or to be positioned at an opening of the vehicle.

12. The liquid retention device (1) according to claim 1, characterized in that it comprises a liquid-tight well (19), which passes through said upper wall (3) and said storage tank (5), said fastening means (17) being positioned within said tight well (19).

13. The liquid retention device (1) according to claim 12, characterized in that it moreover comprises a removable plug (20) configured to seal said tight well (19) in a liquid-tight manner, said plug (20) being configured to be placed in and/or on said tight well (19) from the outer side of the upper wall (3).

14. The liquid retention device (1) according to claim 12, characterized in that said attachment means (26) is positioned at least in part within said tight well (19) or on the latter.

15. The liquid retention device (1) according to claim 13, characterized in that said plug (20) carries said attachment means (26).

16. The liquid retention device (1) according to claim 1, characterized in that said upper wall (3) has wall edges (10) connected to said storage tank (5), said upper wall (3) having a surface (11) devoid of through-holes (4) extending from said wall edges (10).

17. The liquid retention device (1) according to claim 16, characterized in that said surface (11) devoid of through-holes (4) extends in alignment with each wall edge (10) over a respective edge distance (D) from said wall edge (10), said edge distance (D) being higher than or equal to $\frac{1}{10}^{th}$, preferably higher than or equal to $\frac{1}{8}^{th}$, of the dimension of the upper wall (3) considered in alignment with said wall edge (10).

18. The liquid retention device (1) according to claim 1, characterized in that it comprises, below the upper wall (3) and in the storage tank (5), an absorption means (28), such as a sponge material, configured to absorb the liquid flowing from said through-holes (4).

19. The liquid retention device (1) according to claim 18, characterized in that the storage tank (5) comprises a bottom (6), and in that the retention device (1) comprises pressing means (29, 30, 31) configured to press said absorption means (28) against said bottom (6) in order to extract said previously absorbed liquid from said absorption means (28).

20. The liquid retention device (1) according to claim 19, characterized in that the pressing means (29, 30, 31) comprises at least one pressing plate (29) positioned between said upper wall (3) and said absorption means (28).

21. The liquid retention device (1) according to claim 20, characterized in that said pressing means (29, 30, 31) comprises at least one actuator (30), for example a pneumatic or hydraulic cylinder, said actuator (30) being connected to said pressing plate (29).

22. The liquid retention device (1) according to claim 21, characterized in that said actuator (30) is moreover connected to said upper wall (3).

23. The liquid retention device (1) according to claim 7, characterized in that said absorption means (28) is arranged within said storage interstices (9).

24. The liquid retention device (1) according to claim 7, characterized in that said pressing plate (29) is arranged within said storage interstices (9).

25. The liquid retention device (1) according to claim 1, characterized in that it comprises a lower face (35) provided at least locally with a sealing gasket (36), which is intended to be interposed between said lower face (35) and the interior floor (2) of the vehicle, in compression against said interior floor (2), when the liquid retention device (1) is carried on said interior floor (2).

26. The liquid retention device (1) according to claim 9, characterized in that it is designed and configured to ensure the draining of the liquid collected by the storage tank (5) out of the liquid retention device (1) towards the front of the protective stringer (16), and in that said protective stringer (16) defines a portion of the lower face (35) of the liquid retention device (1) that carries said sealing gasket (36).

27. A vehicle comprising an interior floor (2), characterized in that it further comprises at least one liquid retention device (1) fitted to said interior floor (2), said liquid retention device (1) being designed and configured to receive a piece of equipment taken on board said vehicle, in particular during an evacuation mission, and comprising at least:

an attachment means (26) configured to attach said liquid retention device (1) to said on-board equipment, and/or a fastening means (17) configured to attach the retention device (1) to the interior floor (2) of the vehicle, and in particular to a lashing rail (18) fitted to said interior floor (2), an upper wall (3) designed and configured to support said equipment, said upper wall (3) being provided with a plurality of through-holes (4), and a liquid storage tank (5) at least partly arranged below said upper wall (3), said storage tank (5) being designed and configured to collect the liquid passing through said through-holes (4).

\* \* \* \* \*